United States Patent [19]
Ellis et al.

[11] Patent Number: 5,418,973
[45] Date of Patent: May 23, 1995

[54] DIGITAL COMPUTER SYSTEM WITH CACHE CONTROLLER COORDINATING BOTH VECTOR AND SCALAR OPERATIONS

[75] Inventors: James P. Ellis, Hudson; Era Nangia, Marlboro; Nital Patwa, Hudson, all of Mass.; Bhavin Shah, Mountain View, Calif.; Gilbert M. Wolrich, Framingham, Mass.

[73] Assignee: Digital Equipment Corporation, Maynard, Mass.

[21] Appl. No.: 902,149

[22] Filed: Jun. 22, 1992

[51] Int. Cl.[6] .......................... G06F 9/34; G06F 13/00
[52] U.S. Cl. ................................ 395/800; 395/375; 395/425
[58] Field of Search ................ 395/375, 425, 800, 500

[56] References Cited

U.S. PATENT DOCUMENTS

| | | | |
|---|---|---|---|
| 4,128,880 | 12/1978 | Cray, Jr. | 395/800 |
| 4,172,287 | 10/1979 | Kawabe et al. | 364/736 |
| 4,523,206 | 6/1985 | Sasscer | 395/425 |
| 4,594,682 | 6/1986 | Drimak | 395/800 |
| 4,620,275 | 10/1986 | Wallach et al. | 395/800 |
| 4,636,942 | 1/1987 | Chen et al. | 395/725 |
| 4,638,431 | 1/1987 | Nishimura | 395/425 |
| 4,641,275 | 2/1987 | Hatakeyama et al. | 395/800 |
| 4,646,233 | 2/1987 | Weatheford et al. | 395/425 |
| 4,661,900 | 4/1987 | Chen et al. | 395/800 |
| 4,754,398 | 6/1988 | Pribnow | 395/200 |
| 4,760,518 | 7/1988 | Potash et al. | 395/325 |
| 4,771,380 | 9/1988 | Kris | 395/800 |
| 4,827,407 | 5/1989 | Nakatani | 395/800 |
| 4,833,599 | 5/1989 | Colwell et al. | 395/650 |
| 4,888,679 | 12/1989 | Fossum et al. | 395/800 |
| 4,908,825 | 3/1990 | Vea | 370/110.3 |
| 4,949,250 | 8/1990 | Bhandarkar et al. | 395/375 |
| 4,964,035 | 10/1990 | Aoyama et al. | 395/800 |
| 5,123,095 | 6/1992 | Papadopoulos et al. | 395/375 |
| 5,140,681 | 8/1992 | Uchiyama et al. | 395/425 |
| 5,155,843 | 10/1992 | Stamm et al. | 395/575 |
| 5,197,130 | 3/1993 | Chen et al. | 395/325 |
| 5,202,970 | 4/1993 | Schiffleger | 395/425 |
| 5,214,769 | 5/1993 | Uchida et al. | 395/425 |
| 5,222,223 | 6/1993 | Webb et al. | 395/425 |
| 5,247,635 | 9/1993 | Kamiya | 395/425 |

FOREIGN PATENT DOCUMENTS

| | | | |
|---|---|---|---|
| 97790 | 1/1984 | European Pat. Off. | G11C 9/06 |
| 114304 | 8/1984 | European Pat. Off. | G11C 9/06 |
| 465319 | 1/1992 | European Pat. Off. | G06F 12/08 |

OTHER PUBLICATIONS

Brunner et al., "Vector Processing on the VAX 9000 System," Digital Technical Journal, vol. 2, No. 4, Fall 1990, Digital Equipment Corp., Maynard, Mass., pp. 61–79.

(List continued on next page.)

*Primary Examiner*—Parshotam S. Lall
*Assistant Examiner*—Viet Vu
*Attorney, Agent, or Firm*—Denis G. Maloney; Albert P. Cefalo

[57] ABSTRACT

A digital computer system includes a scalar CPU, a vector processor, and a shared cache memory. The scalar CPU has an execution unit, a memory management unit, and a cache controller unit. The execution unit generates load/store memory addresses for vector load/store instructions. The load/store addresses are translated by the memory management unit, and stored in a write buffer that is also used for buffering scalar write addresses and write data. The cache controller coordinates-loads and stores between the vector processor and the shared cache with scalar reads and writes to the cache. Preferably the cache controller permits scalar reads to precede scalar writes and vector load/stores by checking for conflicts with scalar writes and vector load/stores in the write queue, and also permits vector load/stores to precede vector operates by checking for conflicts with vector operate information stored in a vector register scoreboard. Preferably the cache controller includes vector logic which is responsive to vector information written in intra-processor registers by the execution unit. The vector logic keeps track of the vector length and blocks extra memory addresses generated by the execution unit for the vector elements. The vector logic also blocks the memory addresses of masked vector elements so that these addresses are not translated by the memory management unit.

7 Claims, 10 Drawing Sheets

OTHER PUBLICATIONS

Slater et al., "Vector Processing on the VAX Vector 6000 Model 400," Digital Technical Journal, vol. 2, No. 2, Spring 1990, Digital Equipment Corp., Maynard, Mass., pp. 11–26.

Oed et al., "On the Effective Bandwidth of Interleaved Memories in Vector Processor Systems," Proceedings of the 1985 International Conference on Parallel Processing, 20–23 Aug., 1985, IEEE (New York, N.Y.), pp. 33.

S. Wallach, "The CONVEX C-1 64-bit Supercomputer," COMPCON 85, Thirtieth IEEE Computer Society International Conference, 25–28 Feb., 1985, San Francisco, Calif., pp. 122–126.

Gui-Zhong et al., "Vector Streams and Vector Cache," Proceedings of the 1984 International Conference on parallel Processing, 21–24 Aug., 1984, IEEE (New York, N.Y.), pp. 233–235.

"Vector Processing on the VAX 9000 System" by Brunner et al. Digital Technical Journal, vol. 2, No. 4, Fall 1990.

FIG. 2

VECTOR INSTRUCTION ENCODING

ASSEMBLER FORMAT:
VVEQLF  V6,V7       ;IF V6[i] = V7[i] THEN VMR[i] = 1, ELSE VMR[i] = 0
                    ;(VVEQLF IS A VVCMPF PSEUDO-OPCODE)
VVADDF/1 V1,V2,V3   ;V3 = V1 + V2. DO ADDITION UNDER CONTROL OF VMR
                    ;WITH MATCH = 1
VSMULF/U R4,V4,V5   ;V5 = R4 V4 WITH UNDERFLOW EXCEPTION CHECKING ENABLED

INSTRUCTION FORMAT:
VVCMPF  cntrl.rw         ;INSTRUCTION CONSISTS OF OPCODE AND CONTROL WORD
VVADDF  cntrl.rw         ;INSTRUCTION CONSISTS OF OPCODE AND CONTROL WORD
VSMULF  cntrl.rw, scr.rl ;INSTRUCTION CONSISTS OF OPCODE, CONTROL WORD, AND SCALAR SOURCE

ENCODING IN MEMORY:

| BYTE | | |
|---|---|---|
| :0 | FD | ⎫ TWO-BYTE OPCODE FOR VVCMPF |
| :1 | C4 | ⎭ |
| :2 | 8F | ← OPERAND SPECIFIER FOR IMMEDIATE MODE (FOR CONTROL WORD) |
| :3 | 71 | ← CONTROL WORD <7:0>: COMPARE FCN IS EQL AND V7 IS A SOURCE |
| :4 | 06 | ← CONTROL WORD <15:8>: V6 IS A SOURCE |
| :5 | FD | ⎫ TWO-BYTE OPCODE FOR VVADDF |
| :6 | 84 | ⎭ |
| :7 | 8F | ← OPERAND SPECIFIER FOR IMMEDIATE MODE (FOR CONTROL WORD) |
| :8 | 23 | ← CONTROL WORD <7:0>:V3 IS DESTINATION AND V2 IS A SOURCE |
| :9 | C1 | ← CONTROL WORD <15:8>: V1 IS A SOURCE. MASKED OPERATIONS ARE ENABLED AND MATCH =1 |
| :A | FD | ⎫ TWO-BYTE OPCODE FOR VSMULF |
| :B | A5 | ⎭ |
| :C | 8F | ← OPERAND SPECIFIER FOR IMMEDIATE MODE (FOR CONTROL WORD) |
| :D | 45 | ← CONTROL WORD <7:0>: V5 IS DESTINATION AND V4 IS A SOURCE |
| :E | 20 | ← CONTROL WORD <15:8>: VA IS IGNORED. UNDERFLOW EXCEPTION CHECKING IS ENABLED |
| :F | 54 | ← OPERAND SPECIFIER FOR REGISTER MODE WITH SCALAR DATA IN R4 |

DIGITAL COMPUTER SYSTEM WITH CACHE CONTROLLER COORDINATING BOTH VECTOR AND SCALAR OPERATIONS

RELATED APPLICATIONS

Details of the preferred central processing unit for use in the present invention are disclosed in Ser. No. 07/547,597, filed Jun. 29, 1990, entitled ERROR TRANSITION MODE FOR MULTIPROCESSOR SYSTEM, by Rebecca L. Stamm et al., issued on Oct. 13, 1992, as U.S. Pat. No. 5,155,843, incorporated herein by reference.

BACKGROUND OF THE INVENTION

1. Field of the Invention

The present invention relates to digital computers with scalar and vector processing capabilities. More particularly, the invention relates to a digital computer that includes a scalar central processing unit and a vector processor and that transmits vector instructions from the central processing unit to the vector processor through a data path used by the scalar central processing unit for accessing a cache memory.

2. Description of the Related Art

Vector Processing is a widely used means for enhancing the performance of computer applications that contain elements of an array that can be computed in parallel. Vector processors may be "attached" to the I/O bus of a scalar central processing unit (CPU), or tightly coupled (i.e., "integrated") with the scalar CPU. Attached processors can produce good performance increases for applications which require minimal interaction with the scalar CPU. Most applications do require a significant amount of interaction with the scalar CPU, and the overhead to communicate with an attached processor limits the advantages of this type of vector unit.

Integrated vector processors can be classified as either memory-to-memory or register-to-register. In memory-to-memory vector processors, the operands are fetched from memory into one or more vector function units of the vector processor, and the result computed in the vector function unit is returned directly to memory. While this type of vector architecture may work well for applications that use very long vectors, the startup overhead is too costly for most applications to produce the desired increase in performance.

Register-to-register vector architectures work by first loading vector data into high-speed vector registers. Vector operate instructions then specify the vector registers to be operated upon by the vector function units, and the result of each vector function unit is returned to a vector register. Vector store instructions are issued to move the results back to memory. Register-to-register vector architectures have less startup overhead than memory-to-memory architectures, but only a small segment of a long vector can be stored in a vector register, and vector operations between long vectors require multiple load, operate, and store cycles upon segments of the long vectors. Long vector applications are optimized by loading a next segment of a long vector while a previously loaded segment is being operated upon.

Thus for register-to-register vector architectures the vector registers serve as a software controlled first level cache to the vector function units, and the bandwidth to and from the vector register is a key factor in system performance.

A specific implementation of a register-to-register vector processor is usually partitioned as: (1) load/store unit, (2) vector register file, and (3) one or more vector function units, either in a single arithmetic pipeline, or in multiple pipelines for different operations (add, multiply, divide).

In register-to-register implementations the vector processor typically contains the vector registers and vector function units, and is responsive to commands for loading the vector registers with data from a data bus, controlling the vector function units to operate upon the data in the vector registers, and to transmit data from the vector registers onto the data bus. The vector processor, for example, is comprised of two VLSI chips called vector processing elements (VPEs). Each VPE is partitioned into two sections, each section and contains one-quarter of the vector registers and an arithmetic pipeline. Section #1 of VPE #1 contains elements 0,4,8,12 . . . 60 of each of 16 vector registers. Section #2 of VPE #1 contains elements 1,5,9,13 . . . 61. Section #1 of VPE #2 contains elements 2, 6, 10, 14 . . . 62. Section #2 of VPE #2 contains elements 3,7,11,15 . . . 63. When vector operate instructions are executed by the VPEs, the four pipelines are operated in parallel, and thus the VPE can complete 4 operations per cycle. The VPEs contain a two deep instruction queue, allowing the scalar CPU to transfer a next operate instruction to the VPEs while the previous operate instruction is being executed in the VPE pipelines. Upon completion of an operate instruction, the next vector operate instruction starts into the VPE arithmetic pipelines without any bubbles if the instruction code is valid in the VPE instruction queue. The vector register file in each VPE has five ports; two for source operands to the arithmetic pipes, one for the pipe destination, a load port, and a store port. Vector load and stores are processed to and from the vector register file in parallel with the execution of vector operate instructions in the arithmetic pipes.

For many "integrated" vector processors, the load/store unit is separate from the scalar CPU. When a vector load or store instruction is decoded by the scalar CPU, the instruction is sent to the Load/Store unit with the appropriate operand information (base address, stride, and source/destination vector register). This separation of the vector load/store functionality, however, results in a high cost for the logic to support adding vector instructions to a processor. The separate load/store unit requires logic to generate addresses, a memory management unit for vector references, and a memory control unit to access the vector references to/from the vector register file. A performance issue also exists with the latency incurred in sending the base address and stride to the remote load/store unit. Another important consideration is a synchronization issue between the present load/store instruction and subsequent instructions. For systems which require virtual address translations, if the processor attempts to issue beyond the load/store instruction which has been issued to the remote load/store unit before determining all the addresses in the load/store can be translated without taking a memory management exception, the recovery protocol is extremely complicated. Thus implementations with a separate load/store unit choose between additional latency waiting for load/store synchronization or complex recovery mechanisms.

If the load/store unit has a common connection to memory, the cache subsystem is common to the scalar and vector memory controllers. A cache shared by a scalar unit and vector load/store unit requires a complicated sharing protocol. An alternative is for the load/store unit to access memory via a different path than the scalar CPU, with a memory hierarchy containing a cache for data items which are either read or written by the vector load and vector store instructions. Having separate scalar and vector caches works well for applications where minimal interaction is required between the scalar and vector segments of the program, but can drastically degrade the performance of programs where scalar instructions require access to data in the vector cache and vector load/stores instructions need data from the scalar cache.

A specific example of a known system using a scalar CPU and a vector processor is described in Richard A. Brunner et al., "Vector Processing on the VAX 9000 System," *Digital Technical Journal*, Vol. 2, No. 4, Fall 1990, pp. 61–79; and Fossum et al. U.S. Pat. No. 4,888,679, issued Dec. 19, 1989, entitled "Method and Apparatus Using a Cache and Main Memory for Both Vector Processing and Scalar Processing by Prefetching Cache Blocks Including Vector Data Elements", incorporated herein by reference.

SUMMARY OF INVENTION

A digital computer system includes a scalar CPU, a vector processor, and a shared cache memory. The scalar CPU has an execution unit, a memory management unit, and a cache controller unit. The execution unit generates load/store memory addresses for vector load/store instructions. The load/store addresses are translated by the memory management unit, and stored in a write buffer that is also used for buffering scalar write addresses and write data. The cache controller coordinates loads and stores between the vector processor and the shared cache with scalar reads and writes to the cache.

In a preferred embodiment, the cache controller permits scalar reads to precede scalar writes and vector load/stores by checking for conflicts with scalar writes and vector load/stores in the write queue. The cache controller also permits vector load/stores to precede vector operates by checking for conflicts with vector operate information stored in a vector register scoreboard. Preferably this vector register scoreboard is a queue storing information about a plurality of vector operates sent to the vector processor.

Preferably the cache controller includes vector logic which is responsive to vector information written in intra-processor registers by the execution unit. The vector logic keeps track of the vector length and blocks extra memory addresses generated by the execution unit for the vector elements. The vector logic also blocks the memory addresses of masked vector elements so that these addresses are not translated by the memory management unit.

BRIEF DESCRIPTION OF DRAWINGS

The novel features believed characteristic of the invention are set forth in the appended claims. The invention itself, however, as well as other features and advantages thereof, will be best understood by reference to the detailed description of a specific embodiment, when read in conjunction with the accompanying drawings wherein:

FIG. 2 is a diagram illustrating various instruction encoding formats for a typical series of vector instructions in accordance with the vector instruction architecture of FIG. 1;

DESCRIPTION OF THE PREFERRED EMBODIMENT

1. Basic Vector Instruction Architecture

Figure 1:
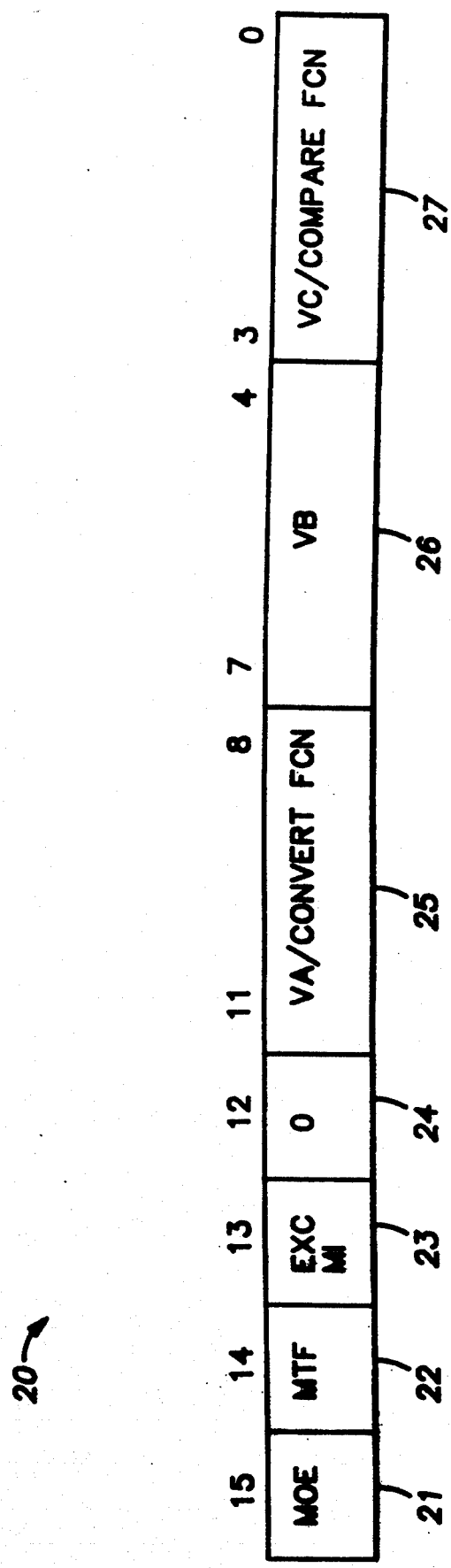
FIG. 1 is a diagram illustrating a format of a vector control word in accordance with a specific vector instruction architecture.

The preferred embodiment of the present invention is a digital computer system that executes variable-length scalar instructions and vector instructions in accordance with the "VAX" (Trademark) brand of instruction architecture of digital computers manufactured and sold by Digital Equipment Corporation of Maynard, Mass. This instruction architecture references 16 vector registers, each of which holds 64 elements of 64 bits each. Instructions that operate on longword integers or longword (F format) floating point data, only manipulate the low-order 32 bits of each element. The lower-order 32 bits of each element are called "longword" elements.

The preferred vector instruction architecture also references a number of vector control registers which specify the elements of a vector register that are processed by a vector instruction. In particular, the vector length register (VLR) specifies the highest-numbered vector register element that is processed by a vector instruction. The vector mask register (VMR) consists of a 64-bit mask, where each mask bit corresponds to one of the possible element positions in a vector register. When instructions are executed under control of the vector mask register, only those elements for which the corresponding mask bit is true are processed by the instruction. Vector compare instructions set the value of the vector mask register. The vector count register (VCR) receives the number of elements generated by a compressed IOTA instruction.

All vector instructions use two-byte extended opcodes. Any necessary scalar operands (e.g., base address and stride for vector memory instructions) are specified by scalar operand specifiers. The instruction formats allow all vector instructions to be encoded in seven classes. The seven basic instruction groups and their opcodes are shown below in Table 1.

TABLE 1

VAX (Trademark) Vector Instruction Classes

Group 1. Vector Memory, Constant-stride
(opcode, control, base, stride)

| | |
|---|---|
| VLDL | Load longword vector data |
| VLDQ | Load quadword vector data |
| VSTL | Store longword vector data |
| VSTQ | Store quadword vector data |

Group 2. Vector Memory, Random-stride
(opcode, control, base, stride)

| | |
|---|---|
| VGATHL | Gather longword vector data |
| VGATHQ | Gather quadword vector data |
| VSCATL | Scatter longword vector data |
| VSCATQ | Scatter quadword vector data |

Group 3. Vector-Scalar Single-precision Arithmetic
(opcode, control, scalar)

| | |
|---|---|
| VSADDL | Integer longword add |
| VSADDF | F_floating add |
| VSBICL | Bit clear longword |
| VSBISL | Bit set longword |
| VSCMPL | Integer longword compare |
| VSCMPF | F_floating compare |
| VSDIVF | F_floating divide |
| VSMULL | Integer longword multiply |
| VSMULF | F_floating multiply |
| VSSLLL | Shift left logical longword |
| VSSRLL | Shift right logical longword |
| VSSUBL | Integer longword subtract |
| VSSUBF | F_floating subtract |
| VSXORL | Exclusive-or longword |
| IOTA | Generate compressed IOTA vector |

Group 4. Vector Control Register Read
(opcode, regnum, destination)

| | |
|---|---|
| MFVP | Move from vector processor |

Group 5. Vector Control Register Write
(opcode, regnum, scalar)

| | |
|---|---|
| MTVP | Move to vector processor |

Group 6. Vector-scalar Double-precision Arithmetic
(opcode control, scalar)

| | |
|---|---|
| VSADDD | D_floating add |
| VSADDG | G_floating add |
| VSCMPD | D_floating compare |
| VSCMPG | G_floating compare |
| VSDIVD | D_floating divide |
| VSDIVG | G_floating divide |
| VSMULD | D_floating multiply |
| VSMULG | G_floating multiply |
| VSSUBD | D_floating subtract |
| VSSUBG | G_floating subtract |
| VSMERGE | Merge |

Group 7. Vector-vector Arithmetic
(opcode, control or regnum)

| | |
|---|---|
| VVADDL | Integer longword add |
| VVADDF | F_floating add |
| VVADDD | D_floating add |
| VVADDG | G_floating add |
| VVBICL | Bit clear longword |
| VVBISL | Bit set longword |
| VVCMPL | Integer longword compare |
| VVCMPF | F_floating compare |
| VVCMPD | D_floating compare |
| VVCMPG | G_floating compare |
| VVCVT | Convert |
| VVDIVF | F_floating divide |
| VVDIVD | D_floating divide |
| VVDIVG | G_floating divide |
| VVMERGE | Merge |
| VVMULL | Integer longword multiply |
| VVMULF | F_floating multiply |
| VVMULD | D_floating multiply |
| VVMULG | G_floating multiply |
| VVSLLL | Shift left logical longword |
| VVSRLL | Shift right logical longword |
| VVSUBL | Integer longword subtract |
| VVSUBF | F_floating subtract |
| VVSUBD | D_floating subtract |

TABLE 1-continued

VAX (Trademark) Vector Instruction Classes

| | |
|---|---|
| VVSUBG | G_floating subtract |
| VVXORL | Exclusive-or longword |
| VSYNC | Synchronize vector memory access |

Within each class, all instructions have the same number and types of operands, which allows the scalar processor to use block-decoding techniques. The differences in operation between the individual instructions within a class are irrelevant to the scalar processor and need only be known by the vector processor. Important features of the instruction set are: (1) Support for random-strided vector memory data through gather (VGATH) and scatter (VSCAT) instructions; (2) Generation of compressed IOTA vectors (through the IOTA instruction) to be used as offsets to the gather and scatter instructions; (3) Merging vector registers through the VMERGE instruction; and (4) The ability for any vector instruction to operate under control of the vector mask register.

Additional control information for a vector instruction is provided in the vector control word (shown as "control" in Table 1), which is a scalar operand following the opcode of most vector instructions. The control word operand can be specified using any addressing mode. However, compilers for the VAX (Trademark) brand of instruction architecture generally use immediate mode addressing (that is, place the control word within the instruction stream).

The format of a vector control word 20 is shown in FIG. 1. The vector control word includes a MOE bit 21, an MTF bit 22, an EXC or MI bit 23, a 0 bit 24, a Va (or convert function) field 25, a Vb field 26, and a Vc (or compare function) field 27. The MOE bit 21 specifies whether the particular instruction operates under control of the vector mask register. The MTF bit 22 specifies what bit value corresponds to "true" for vector mask register bits, and it assists a compiler in vectorizing if-then-else constructs. In vector arithmetic instructions the bit 23 is denoted as EXC and it is used to enable integer overflow and floating underflow exception reporting. In vector memory load instructions the bit 23 is denoted as MI and it is used to indicate modify-intent. The Va, Vb, and Vc fields 25, 26, 27 indicate the source and destination vector registers to be used by the instruction. These fields also indicate the specific operation to be performed by a vector compare or convert instruction.

FIG. 2 shows various encoding for a typical series of vector instructions in assembler format, in instruction format, an in memory.

2. Vector Execution Model

Figure 3:
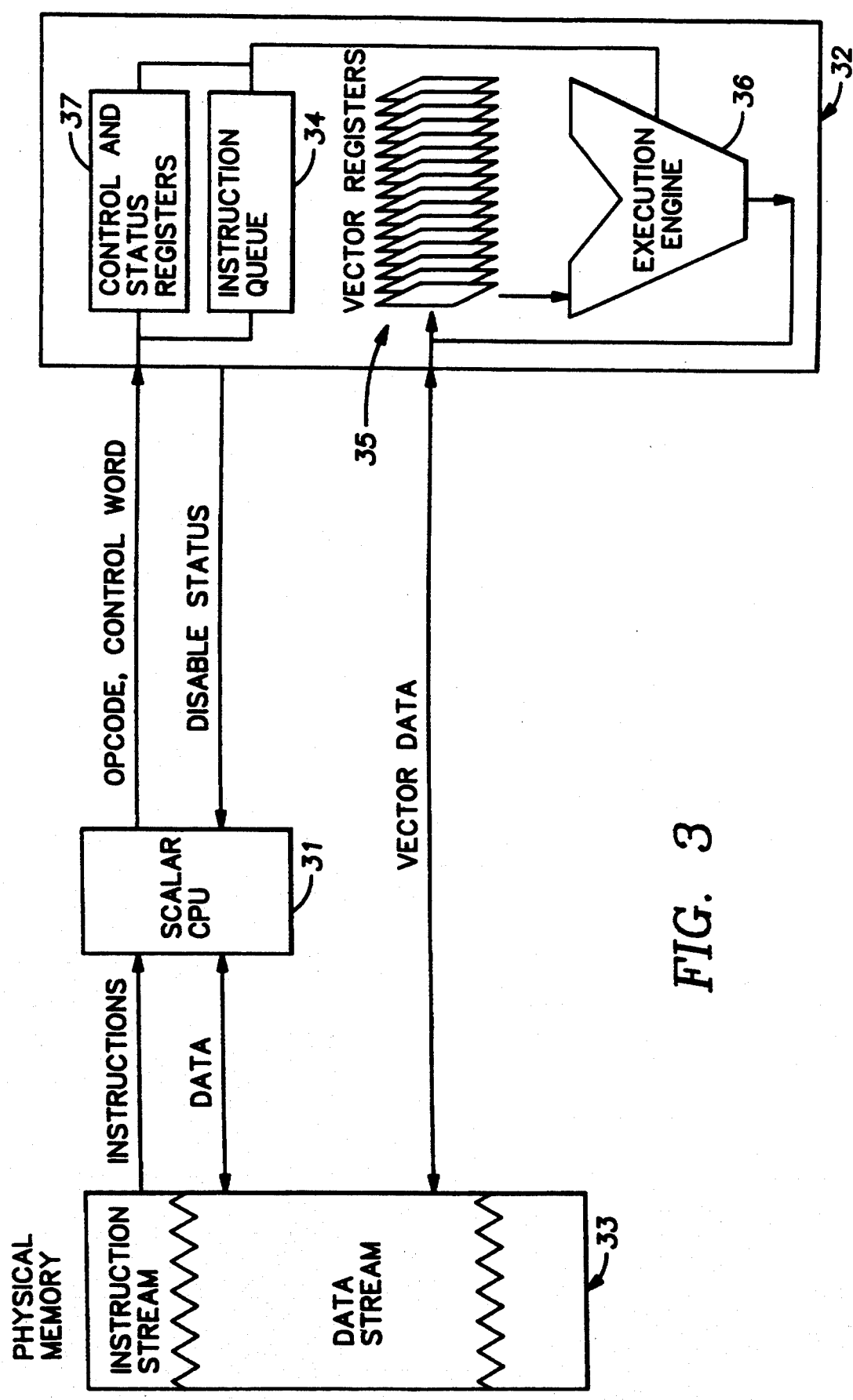
FIG. 3 is a block diagram of an execution model of generic hardware for executing vector instructions in accordance with the vector instruction architecture of FIG. 1.

Shown in FIG. 3 is a program execution model of a digital computer system 30 including a scalar central processing unit (CPU) 31 and an associated vector processor 32. Together, the scalar and vector processors 31, 32 are referred to as a "scalar/vector pair". A multiprocessor system typically includes a number of these scalar/vector pairs, although asymmetric configurations are sometimes used in which only some of the processors in a multiprocessor system contain a vector processor.

For good performance, the scalar CPU 31 operates asynchronously from its vector processor 32 whenever possible. Asynchronous operation allows the execution of scalar instructions to be overlapped with the execution of vector instructions. Furthermore, the servicing of interrupts and scalar exceptions by the scalar CPU 31 does not disturb the execution of the vector processor 32, which is freed from the complexity of resuming the execution of vector instructions after such events. However, the asynchronous execution does cause the reporting of vector exceptions to be imprecise. Special instructions are provided to ensure synchronous operation when necessary.

Both scalar and vector instructions are initially fetched from physical memory 33 and decoded by the scalar CPU 31. If the opcode specifies a vector instruction, the opcode and necessary scalar operands are issued to the vector processor 32 and placed in its instruction queue 34. The vector processor 32 accesses physical memory 33 directly for any vector data that it must read or write. The vector data is loaded into one or more vector registers 35, executed by an execution engine 36, and results are stored from one or more of the vector registers 35 back into the physical memory 33. For most vector instructions, once the scalar CPU 31 successfully issues the vector instruction, it proceeds to process other instructions and does not wait for the vector instruction to complete.

When the scalar CPU attempts to issue a vector instruction, it checks to see if the vector processor 32 is disabled, i.e. whether it will accept further vector instructions. If the vector processor 32 is disabled, then the scalar CPU takes a "vector processor disabled" fault. An operating system handler is then invoked on the scalar CPU to examine various control and status registers 37 in the vector processor 32 to determine the disabling condition. The vector processor 32 disables itself to report the occurrence of vector arithmetic exceptions or hardware errors. If the disabling condition can be corrected, the handler enables the vector processor 32 and directs the scalar CPU 21 to reissue the faulted vector instruction. The operating system may also disable the vector processor 32 (or prevent the scalar CPU from issuing vector instructions to a vector processor absent from the system) by writing to a privileged register (not shown) in the scalar CPU.

Within the constraint of maintaining the proper ordering among the operations of data-dependent instructions, the instruction architecture explicitly allows the vector processor 32 to execute any number of the instructions in its queue 34 concurrently and retire them out of order. Thus, a vector implementation can chain and overlap instructions to the extent best suited for its technology and cost-performance. In addition, by making this feature an explicit part of the architecture, software is provided with an execution model that ensures correct results regardless of the extent a particular implementation chains or overlaps.

The program execution model shown in FIG. 3 shows the minimal hardware for fetching the instructions from physical memory 33, decoding the instructions and executing the scalar instructions in a scalar CPU 31, and executing instructions in the vector processor 32. The program execution model, however, does not specify various system components that enhance performance and reduce hardware requirements for the enhanced performance. The program execution model, for example, does not specify whether the vector processor 32 shares memory management hardware such as a translation buffer with the scalar CPU 31, or whether it has its own memory management hardware. Nor does the program execution model specify whether a cache memory is used in the system, or whether the scalar CPU or the vector processor each have their own cache or share a common cache.

3. Preferred Hardware Implementation a) General Description

In accordance with a basic aspect of the present invention, improved performance is obtained over a wide range of vector applications by implementing a register-to-register vector architecture, with a shared write-back cache for scalar and vector data elements, and by using the scalar CPU internal pipeline and cache data bus to accomplish the vector load/store and operate transfers to the vector arithmetic unit functions.

Figure 4:
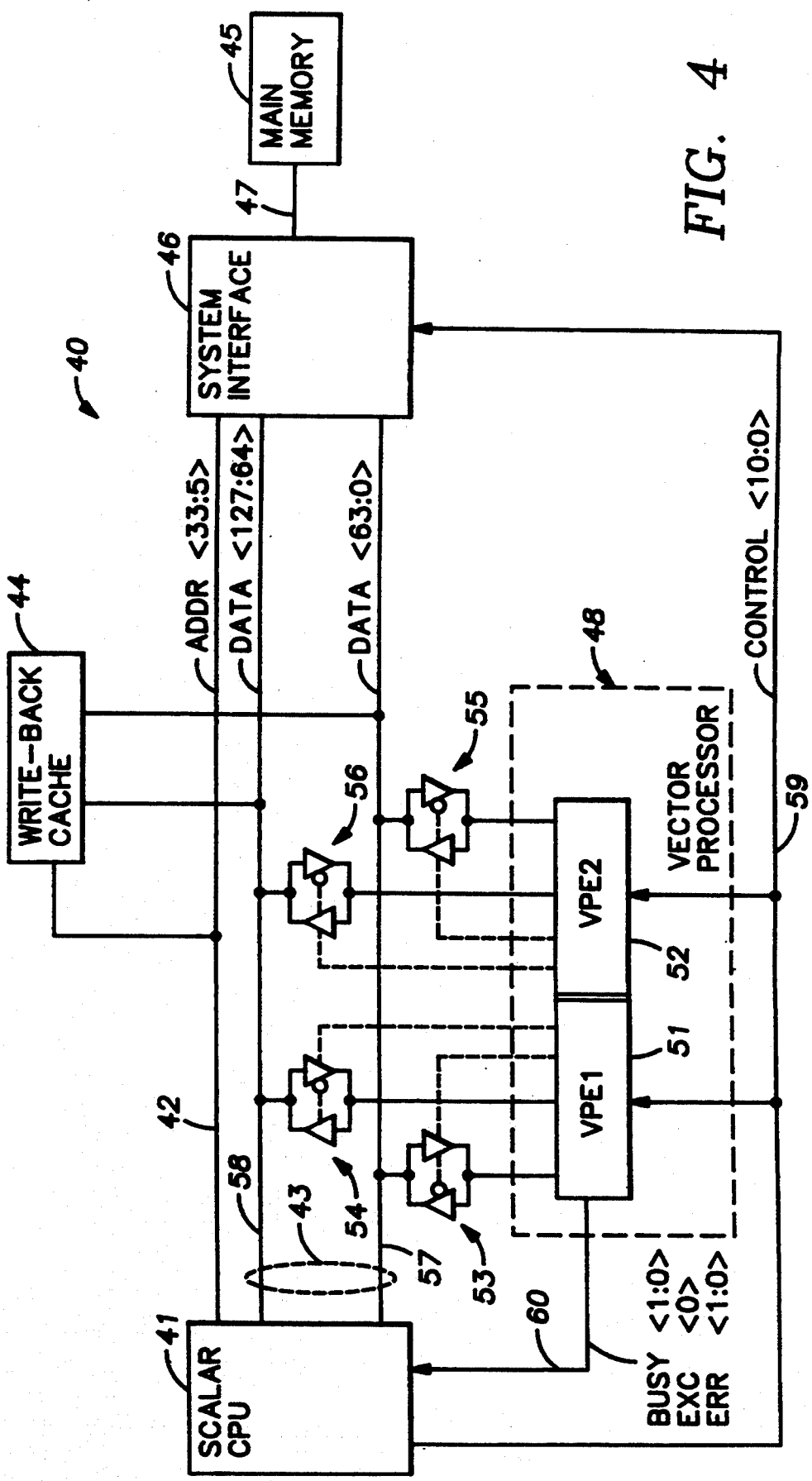
FIG. 4 is a block diagram of a digital computer system in accordance with the present invention.

A block diagram of the preferred hardware configuration is shown in FIG. 4. The digital computer system 40 includes a scalar CPU 41 that uses a common address bus 42 and a common data bus 43 to access a write-back cache 44 and to access a main memory 45 through an interface 46 to a system bus 47. In a multi-processor system (not shown), the system bus 47 connects other scalar CPUs (not shown) to the main memory 45, so that the main memory is shared among the scalar CPUs.

For executing vector instructions issued by the scalar CPU 41, the digital computer system 40 includes a vector processor 48 comprised of two vector processor element (VPE) chips 51, 52 connected to the common data bus 43. This connection is made via sets of transceiver chips 53, 54, 55, 56 which minimize the added loading. The sets of transceiver chips 53, 54, 55, 56 usually assert signals from the data bus 43 onto the VPE chips 51, 52, but during a vector store operation, the transceiver chips assert signals from the VPE chips onto the data bus.

The VPE chips 51, 52 have interfaces (103 in FIG. 7) that function as a 2×2 crossbar for multiplexing a lower order 64-bit portion 57 and a higher-order 64-bit portion 58 of the data bus 43 between sixty-four bit vector registers in the chips 51, 52. The data bus 43 therefore provides a high bandwidth interface for the VPEs 51, 52 with the cache 44. For double precision stride-one load and store operations, two sixty-four bit vector elements can be accessed to or from the cache 44 per cycle. For single precision load and store operations, four elements can be read or written each cycle. For stride two longword vectors, two elements can be accessed for each cycle of the cache 44.

As will be further described below, vector register addresses, the location of vector operands, and other control signals for initiating an operation by the VPE's 51, 52 are transmitted from the scalar CPU 41 to the VPE chips over a control bus 59. The control bus 59 also sends control information to the system interface 46. Each VPE chip 51, 52 sends a BUSY signal back to the scalar CPU 41 when the chip is busy completing a vector operation, together with a respective error-indicating signal ERR and a common exception-indicating signal EXC, over a status bus 60 from the VPE chips to the CPU. Each of the VPE chips 51, 52 has an open-drain output for asserting the exception signal EXC, and these open-drain outputs of the two VPE chips are connected in parallel in a wired-OR relationship. Therefore the scalar CPU 41 and the vector processor 48 have a "master-slave" relationship, with the scalar CPU issuing vector instructions and the VPE signaling completion of execution, although the scalar CPU may immediately recognize an exception from the vector processor.

In one example, the system of FIG. 4 may have a write-back cache 44 of 256 Kbytes, and a main memory 45 of 128 Mbytes. In this example, the access time of the write-back cache 44 may be about 25 nanoseconds (two CPU machine cycles), while the access time of the main memory 45 from the CPU 41 via the system bus 47 may be ten or twenty times that of the write-back cache. The machine cycle is nominally 14 nanoseconds; i.e., the clock frequency is about 71 MHz. The address bus 42 and data bus 43, however, operate on a bus cycle which is three times longer than the machine cycle of the CPU, so in this example the bus cycle is nominally 42 nsec.

b). The Scalar CPU

Figure 5:
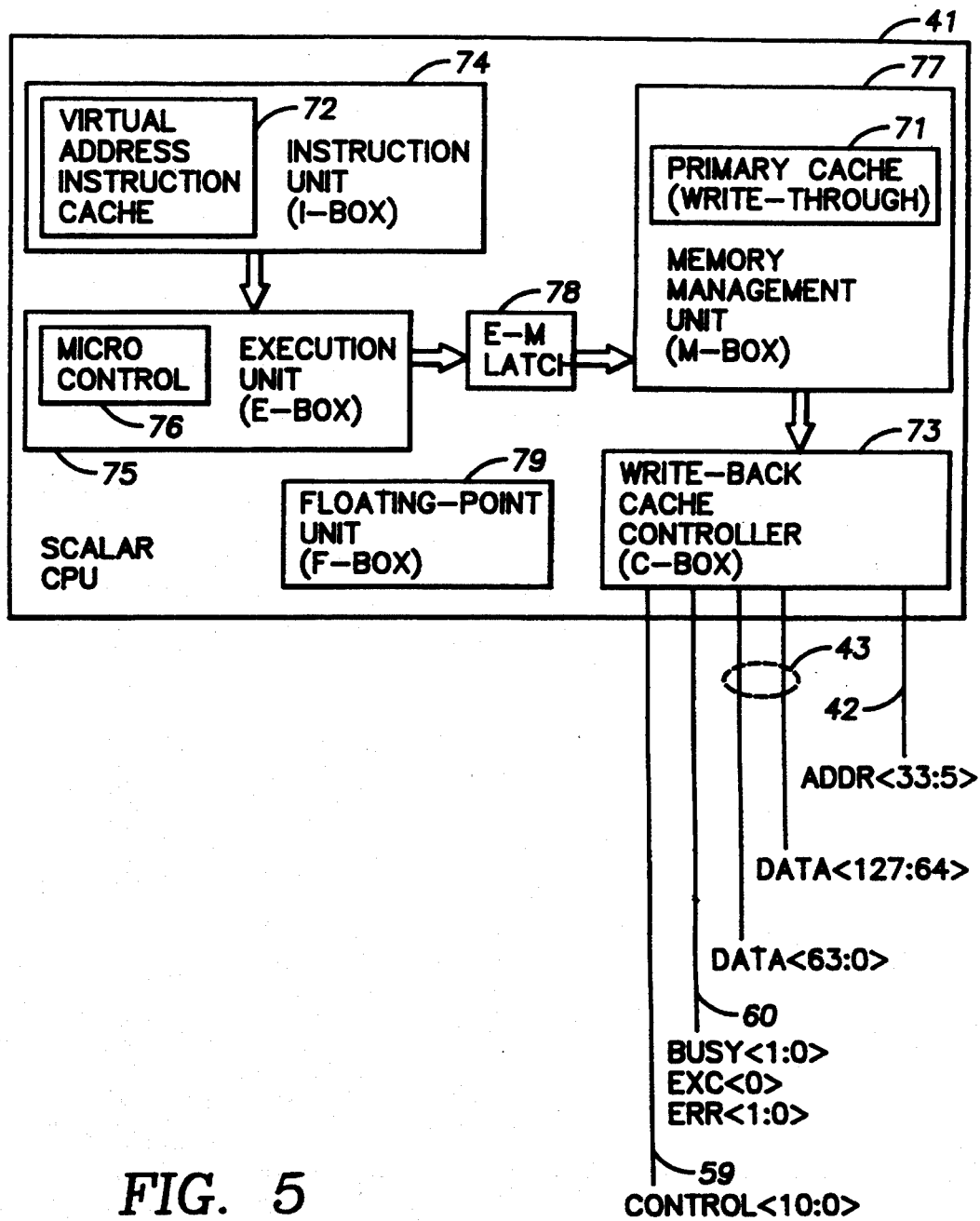
FIG. 5 is a block diagram of a preferred scalar CPU for use in the digital computer system of the present invention.

Turning now to FIG. 5, there is shown a block diagram of the preferred scalar CPU 41, which is integrated on a single chip.

When fetching instructions or data, the scalar CPU 41 accesses an on-chip primary cache 71, then the larger write-back cache (44 in FIG. 4) which is comprised of off-chip RAMs. Thus, a hierarchical memory is employed, the fastest being the primary cache 71, then the write-back cache (44 in FIG. 4), then the main memory (45 in FIG. 4), usually followed by disk memories (not shown) connected to the system bus (47 in FIG. 4). A virtual memory organization is employed, with page swapping between the disks (not shown) and main memory (45 in FIG. 4) used to keep the most-likely-to-be-used pages in the main memory. The scalar CPU 41 includes a virtual address instruction cache 72 that stores instructions only, using the virtual addresses instead of physical addresses. Physical addresses are used for accessing the primary cache 71 and write-back cache (44 in FIG. 4), and used on the system bus (47 in FIG. 4) and in the main memory (45 in FIG. 4).

When the CPU 41 fetches an instruction, first the virtual address instruction cache 72 is checked, and if a cache miss occurs the address is translated to a physical address and the primary cache 71 is checked. If the instruction is not in the primary cache 71, the write-back cache (44 in FIG. 4) is accessed, and upon a cache miss in the write-back cache, the main memory (45 in FIG. 4) is accessed. The primary cache 71 is smaller but faster than the write-back cache (44 in FIG. 4), and the content of the primary cache is a subset of the content of the write-back cache. The virtual instruction cache 72 differs from the operation of the other two caches 71, 44 in that there are no writes to the cache 72 from the scalar CPU 41 except when instructions are fetched, and also the content of this cache 72 need not be a subset of the content of the caches 71 or 44, although it may be.

The scalar CPU 41 includes a write-back cache controller 73 that accesses the write-back cache 44 through the address bus 42 and data bus 43, which are bidirectional and also include appropriate request, grant, command, and parity lines.

The scalar CPU includes an instruction unit 74 and an execution unit 75 controlled by micro-coded controller 76. The instruction unit 74 decodes instruction from the virtual address instruction cache 72, and passes instruction opcode information and operand specifiers to the execution unit 75.

The scalar CPU 41 also includes a memory management unit 77 that receives read requests from the instruction unit 74 (both instruction stream and data stream) and from the execution unit 75 (data stream only). The memory management unit 77 delivers memory read data to either the instruction unit 74 (64-bits wide) or the execution unit 75 (32-bits wide). The memory management unit 77 also receives write/store requests from the execution unit 75, as well as invalidates, primary cache 71 fills and return data from the write-back cache controller 73. The memory management unit 77 arbitrates between these requesters, and queues requests which cannot currently be handled. Once a request is started, the memory management unit 77 performs address translation, mapping virtual to physical addresses, using a translation buffer. This address translation takes one machine cycle, unless there is a miss in the translation buffer. In the case of a miss, the memory management unit 77 causes a page table entry to be read from page tables in memory and a translation buffer fill is performed to insert the address which missed. The memory management unit also performs all access checks to implement page protection.

The primary cache 71 referenced by the memory management unit 77 is a two-way set associative write-through cache with a block and fill size of 32-bytes.

The write-back cache controller 73 receives read requests and writes from the memory management unit 77, and sends primary cache 71 fills and invalidates to the memory management unit. The cache controller 73 ensures that the primary cache 71 is maintained as a subset of the write-back cache 44 by the invalidates.

In response to a memory read request (other than a READ LOCK), the memory management unit 77 accesses the primary cache 71 for the read data. If the primary cache 71 determines that requested read data is not present, a "cache miss" or "read miss" condition occurs. In this event, the memory management unit 77 instructs the write-back cache controller 73 to continue processing the read. The cache controller 73 first looks for the data in the write-back cache 73 and fills the block in the primary cache 71 from the write-back cache 44 if the data is present. If the data is not present in the write-back cache 44, the cache controller 73 requests a cache fill from the main memory 45. When the main memory 45 returns the data, it is written to both the write-back cache 44 and to the primary cache 71. The cache controller 73 sends four quadwords of data to the memory management unit 77 using instruction-stream cache fill or data-stream cache fill commands. The four cache fill commands together are used to fill the entire primary cache 71 block corresponding to the hexaword read address on the address bus 42. In the case of data-stream fills, one of the four cache fill commands will be qualified with a signal indicating that this quadword fill contains the requested data-stream data corresponding to the quadword address of the read. When this fill is encountered, it will be used to supply the requested read data to the memory management unit 77, instruction unit 74 and/or execution unit 75. If, however, the physical address corresponding to the cache fill command falls into I/O space, only one quadword fill is returned and the data is not cached in the primary cache 71. Only memory data is cached in the primary cache 71.

All writes are initiated by the memory management unit 77 on behalf of the execution unit 75. The primary cache 71 is a write-through cache; therefore, writes are only written into the primary cache 71 if the write address matches a validated primary cache 556 tag entry. The one exception to this rule is when the primary cache 71 is configured in force data-stream hit mode; in this mode, the data is always written to the primary cache 71 regardless of whether the tag matches or mismatches. All write references which pass memory management checks are transferred to the write-back cache controller 73; the cache controller processes writes in the write-back cache 44 in accordance with protocols related to the write-back memory subsystem.

The present invention more particularly concerns the operation of the cache controller 73 for executing vector instructions. Therefore, the specific construction of the components in the CPU 41 other than the cache controller 568 are not pertinent to the present invention. The reader, however, may find additional details in Ser. No. 07/547,597, filed Jun. 29, 1990, entitled ERROR TRANSITION MODE FOR MULTI-PROCESSOR SYSTEM, by Rebecca L. Stamm et al., issued on Oct. 13, 1992, as U.S. Pat. No. 5,155,843, herein incorporated by reference.

Microcode of the execution unit 75 is used to generate vector load/store addresses, and the memory management unit 77 is used to translate both scalar and vector references. For stride-one vector applications, an octaword can be accessed each cycle, and the write-back cache 44 does not thrash between scalar and vector accesses. The logic needed to support the VPEs 51, 52 is in the cache controller 73, with the exception of added microcode and corresponding microcode test inputs in the micro-controller 76 of the execution unit 75, and two modifications to the memory management unit 77.

The microcode in the micro-controller 76 controls the execution unit 75 to generate the memory addresses for the VLD, VSTR, Gather, and Scatter vector instructions. The microcode also controls the execution unit to format a vector opcode and control word, as further described below, and to place it into the data pipeline through an E-M latch 78, through the memory management unit 77, and through the write-back cache controller 73, to the VPEs 51, 52. The microcode also controls the execution unit 75 to read and write to vector processor control registers in the write-back cache controller 73, by issuing IPR read and IPR write commands into the data pipeline to the cache controller.

For register-to-register vector architectures a vector length register (VLR) is commonly used to determine the number of elements to be processed, and a vector mask register is used to enable and disable individual vector elements. Preferably the vector length register is placed in the cache controller 73, and a vector mask register is included in each VPE 51, 52 as well as the cache controller 73. The vector mask register in the cache controller 73 enables and disables the generation of load and store commands for executing vector load and store instructions. The microcode of the E-Box 75 generates one load/store vector address per cycle, but the microcode does not have to count the number of vector elements specified by a vector instruction. The counting is performed by vector logic in the cache controller, and when the count reaches the highest number indicated by the VLR, any extra vector addresses are discarded before reaching the memory management unit 77. The vector logic sends a completion signal to the micro-controller 76, causing the microcode to exit an address generation loop, and this completion signal inhibits any extra vector address from passing through the E-M latch 78. The VLR could be placed anywhere external to the micro-controller as long as any extra addresses are discarded before reaching the memory management unit 77.

The memory management unit 77 requires two additional control functions; bypass of the primary cache 71 cache for vector loads (VLD), and block invalidate of the primary cache hits for vector stores (VSTR). The memory management unit 77 of the scalar CPU 41 is used to support address translation of both vector and scalar references, and the minimal modifications required for supporting vector references shows the advantage of integrating vector load and store logic with the scalar CPU pipeline.

The cache controller 73 includes interface logic to the VPEs that transmits vector instructions, reads/writes vector registers, read arithmetic errors from the VPEs, reads offsets from VPEs for Gather/Scatter, controls vector loads (VLD) and vector stores (VSTR), controls a vector register conflict "scoreboard" of up to two vector operations at VPEs, retries at same element/address after cache fill, and determines register file address (RFA) and cycle type (CT) codes for steering vector operands to vector registers in the VPEs. Therefore the write-back cache controller 73 integrates vector load/store operations with access to the write-back cache. A separate queue for vector references could be added to the cache controller 73, but preferably a write queue used for buffering scalar writes is modified to include both scalar writes and provide packer/queue logic for vector load/store address queuing. Therefore the write queue can handle all write-read conflict checking for memory accesses. Moreover, the system interface logic (46 in FIG. 1) accesses main memory for cache misses for both vector and scalar references eliminating the need for a separate memory controller for vector loads and stores. This integral load/store support for vectors removes performance problems associated with separate scalar and vector caches, as well as vector/scalar synchronization losses, and insures adequate cache size for vector applications.

The two VPE's together include sixteen vector registers, each vector register has sixty-four elements, and each element has sixty-four bits. The cycle type (CT) codes are used by the VPEs 508, 510 to determine which quadwords or longwords are to be directed to an addressed vector register. The addressed vector register is specified by the register file address RFA. The CT codes control a data bus interface in each VPE 51, 52, to effectively provide a 4×4 crossbar for a single precision and a 2×2 crossbar switch for double precision accesses as follows (where $<x:y>$ denotes a field of bits including bit x, all bits between x and y, and bit y):

TABLE 2

| Cycle Type Control of Data Transfer | | |
|---|---|---|
| CT | Data Transfer | |
| L1 | RFA ← bus<31:0> | |
| L2 | RFA ← bus<63:32> | |
| L3 | RFA ← bus<95:64> | |
| L4 | RFA ← bus<127:96> | |
| L1, L2 | RFA ← bus<31:0>, | RFA+1 ← bus<63:32> |
| L2, L3 | RFA ← bus<63:32> | RFA+1 ← bus<95:64> |

TABLE 2-continued

Cycle Type Control of Data Transfer

| CT | Data Transfer | | |
|---|---|---|---|
| L3, L4 | RFA ← bus<95:64>, | RFA+1 ← bus<127:96> | |
| L1, L2, L3 | RFA ← bus<31:0>, | RFA+1 ← bus<63:32>, | RFA+2 ← bus<95:64> |
| L2, L3, L4 | RFA ← bus<63:32>, | RFA+1 ← bus<95:64>, | RFA+2 ← bus<127:96> |
| L1, L2, L3, L4 | RFA ← bus<31:0>, | RFA+1 ← bus<63:32>, | |
| | RFA+2 ← bus<95:64>, | RFA+2 ← bus<127:96> | |
| L1, L3 | RFA ← bus<31:0>, | RFA+1 ← bus<95:64> | !for stride 2 long |
| Q1 | RFA ← bus<63:0> | | |
| Q2 | RFA ← bus<127:64> | | |
| Q1, Q2 | RFA ← bus<63:0>, | RFA ← bus<127:64> | |

Cache reads and writes are pipelined, providing a cycle for the VPE crossbar function, thus eliminating the CT function from the cache access path.

Figure 6:
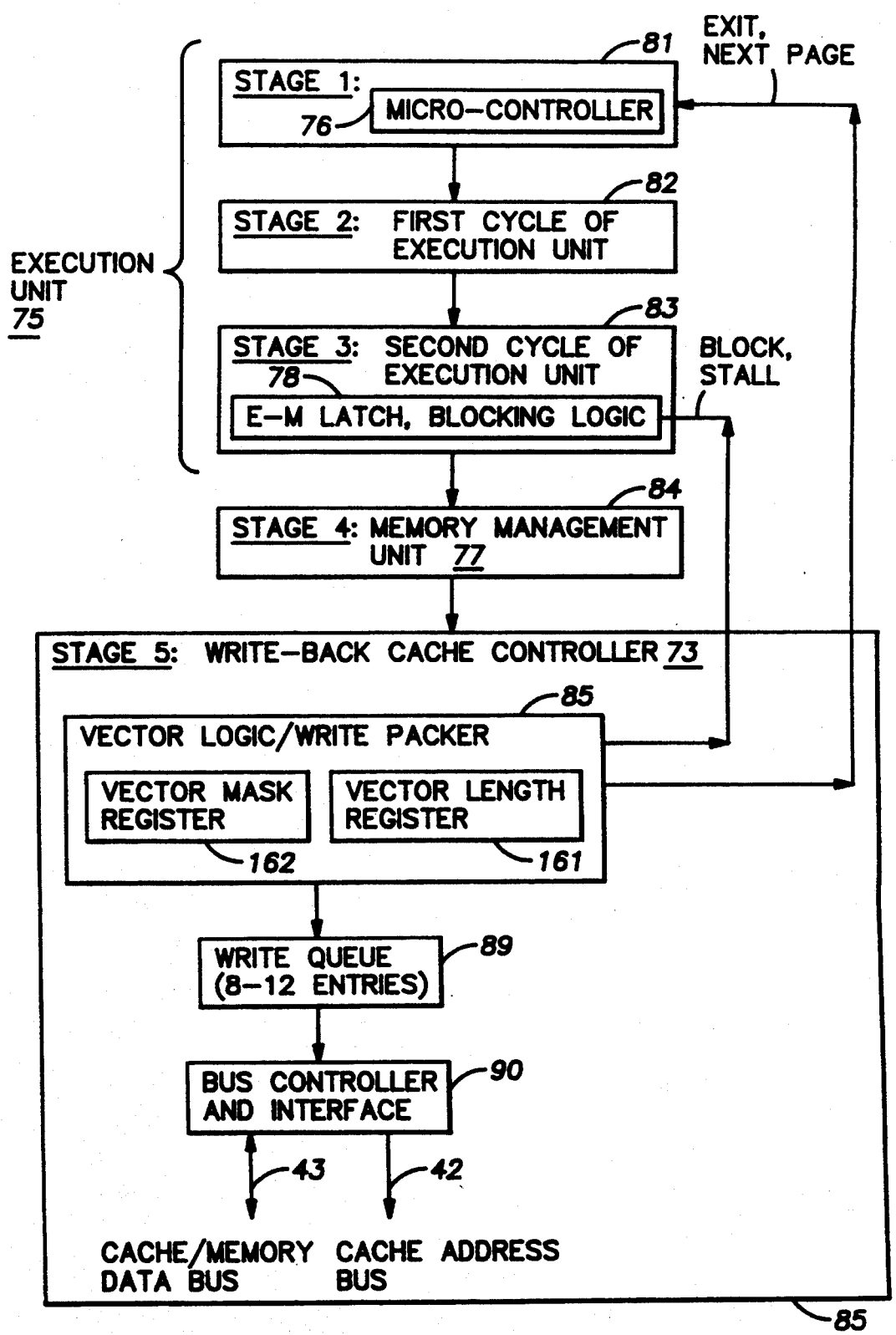
FIG. 6 flow diagram illustrating a pipeline sequence for processing a vector instruction in the scalar CPU of FIG. 5.

FIG. 6 shows the execution pipeline in the scalar CPU for vector load/store instructions. The first stage 81 includes the micro-controller 76 in the execution unit 75. The second stage 82 is execution by the execution unit, in response to a micro-control word generated by the micro-controller. The third stage 83 is transmission of results of the execution unit through the E-M latch and blocking logic 78. The fourth stage 84 is operation by the memory management unit 77, which may involve virtual-to-physical address translation. The fifth stage is operation by the write-back cache controller 73, which may involve a number of cycles as a command passes through vector logic and a write packer 85, a write queue 89, and finally a bus controller and interface 90.

The microcode for a vector load or store instruction begins with transmitting the vector instruction opcode and control word as part of an IPR write command through stages 2 to 4 of the pipeline to the vector logic 86. The vector logic keeps track of the length of the vector in the vector length register 161, and keeps a copy of the vector mask in a vector mask register 162, to check whether the address of the last element of the vector has reached the cache controller 73, and to check whether the next element is masked. Then the microcode begins controlling the execution unit to sequentially compute virtual memory addresses of the vector elements, beginning with a base address, which is successively incremented by the stride of the vector. These memory addresses are also passed through the pipeline, but the address for a masked reference is blocked at the E-M latch, and any element following the last element of the vector is also blocked at the E-M latch. In stage 4, the virtual memory addresses are translated to physical addresses by the memory management unit, where load addresses bypass the primary cache 71 and store addresses invalidate hit blocks in the primary cache. In the vector logic 85, the length of a vector element reference is checked against the maximum specified length in the vector length register 161, and when the maximum length is reached, a block and stall signal is sent to the E-M latch, and an exit signal is sent to the micro-controller to terminate address generation for the vector elements. The micro-controller may also be informed at this stage of a page crossing. The vector element reference is then loaded into the write queue 89. When the write queue 89 is serviced, the memory address for the vector element reference passes through the bus controller and interface 90 and is looked up in tag memory of the write-back cache 44, and if there is a hit, data is transferred between the VPEs 51, 52 and the data memory of the write-back cache.

c) The Vector Processor Elements

Figure 7:
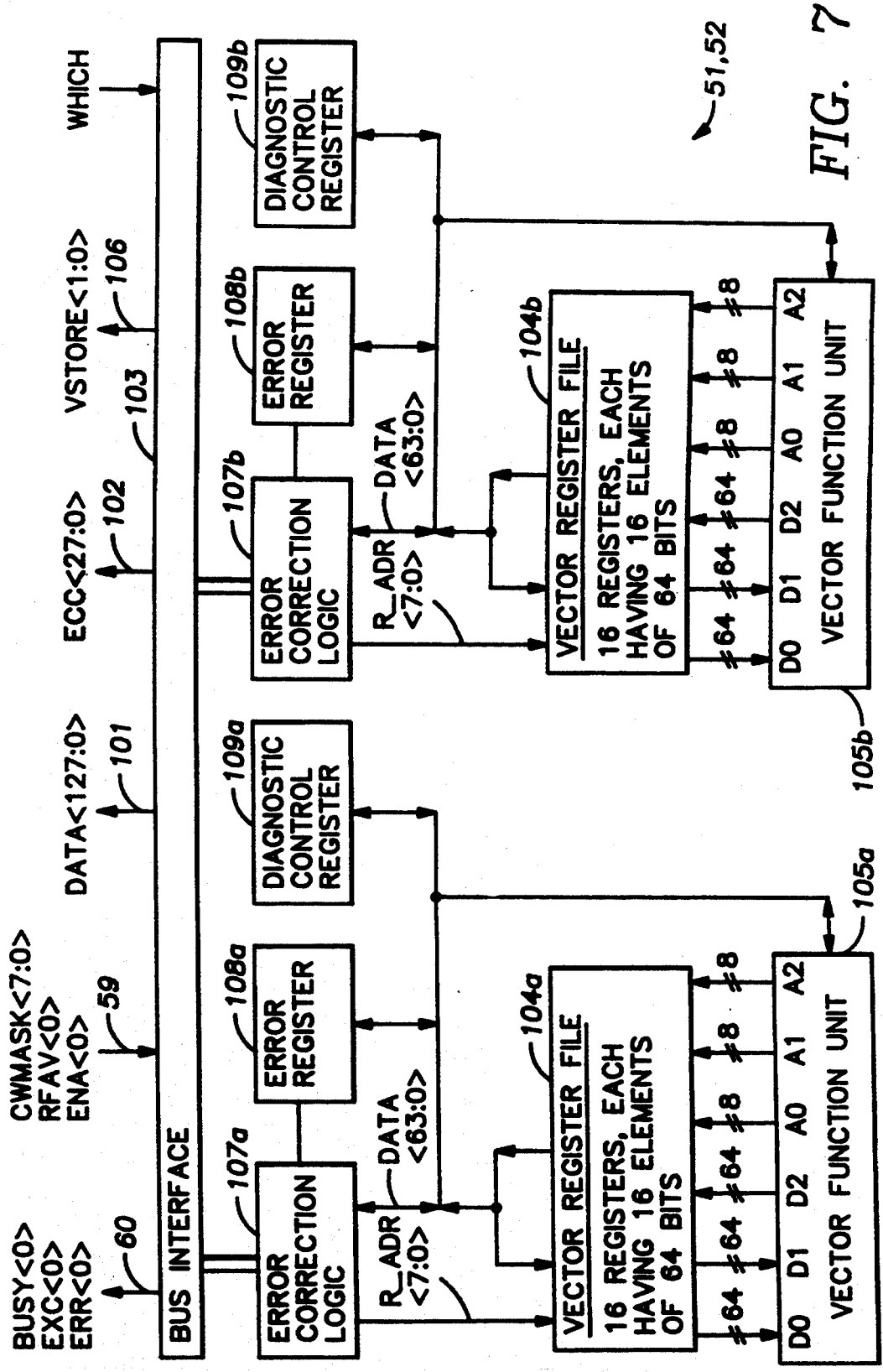
FIG. 7 is a block diagram of a vector processor element consisting of one-half of a preferred vector processor for use in the digital computer system of the present invention.

Referring now to FIG. 7, there is shown a block diagram of one of the vector processing elements 51, 52. The two VPEs 51, 52 are identical chips. So that the system may distinguish the two VPEs 51, 52, each has an input (WHICH) that is tied to a logic low for one of the elements, and is tied to a logic high for the other of the elements.

The output drivers of the VPE are enabled by an enable signal (ENA), and receive a register file access control command in two successive control word bytes (CWMASK) when a control signal (RFAV) indicates a valid vector command. The first byte contains a read/write control signal WRL, the cycle type CT<3:0>, and three bits of the register file address RFA<2:0>. The second byte contains the remaining bits of the register file address RFA<10:3>. The VPE's only respond to addresses in the range of 0:3FF and 440:45F, and control and status registers are accessed by RFA as well as the elements of the vector register files. Therefore vector commands as well as data can be loaded into the VPE over 128 data lines 101, which are protected by twenty-eight lines 102 carrying an error correction code (ECC) for the data.

The VPE has a bus interface 103 that decodes the cycle type and functions as a 4×4 cross-bar switch for data transfer between vector registers in the register file and the 128 data lines 101. Each VPE is partitioned into two sections, and each register file section 104a, 104b contains one-quarter of the vector registers 104a, 104b and a vector function unit 105a, 105b. Section 104a of VPE 51 contains elements 0,4,8,12 . . . 60 of each of 16 vector registers. Section 104b of VPE 51 contains elements 1,5,9,13 . . . 61. Section 104a of VPE 52 contains elements 2, 6, 10, 14 . . . 62. Section 104b of VPE 52 contains elements 3,7,11,15 . . . 63. The bus interface 103 also decodes the cycle type (CT) to assert a buffer direction control signal VSTORE<1:0> on lines 106 during a read access to the VPE, such as a vector store operation. The buffer direction control signal controls the bidirectional buffers 53, 54 associated with VPE 51 or the bidirectional buffers 55, 56 associated with VPE 52 as shown in FIG. 4.

The vector register file 104a, 104b in each section of the VPE has five ports; two for source operands to the arithmetic pipes, one for the pipe destination, a load port, and a store port. Vector load and stores are processed to and from the vector register file in parallel with the execution of vector operate instructions in the vector function units 105a, 105b. The loads and stores to the vector register file sections 104a, 104b transfer sixty-four bits of data to a register element specified by an eight-bit address RADDR<7:0>. (The numbers next to the double-slashed lines in FIG. 7 indicate the number of bits carried by the double-slashed lines.) The address and data pass through error correction logic 107a, 107b interconnecting the bus interface 103 and the register file sections 104a, 104b, and errors are flagged in error registers. Diagnostic control information is recorded in a diagnostic control register 109a, 109b in each section. The scalar CPU is informed of an error via an error signal ERR<0> on the bus 60, and exceptions are signaled by an open drain signal EXC<0> on the bus 60. The busy signal on the bus 60 is asserted when the VPE starts writing the results for the current instruction and is de-asserted when the instruction is finished.

Figure 8:
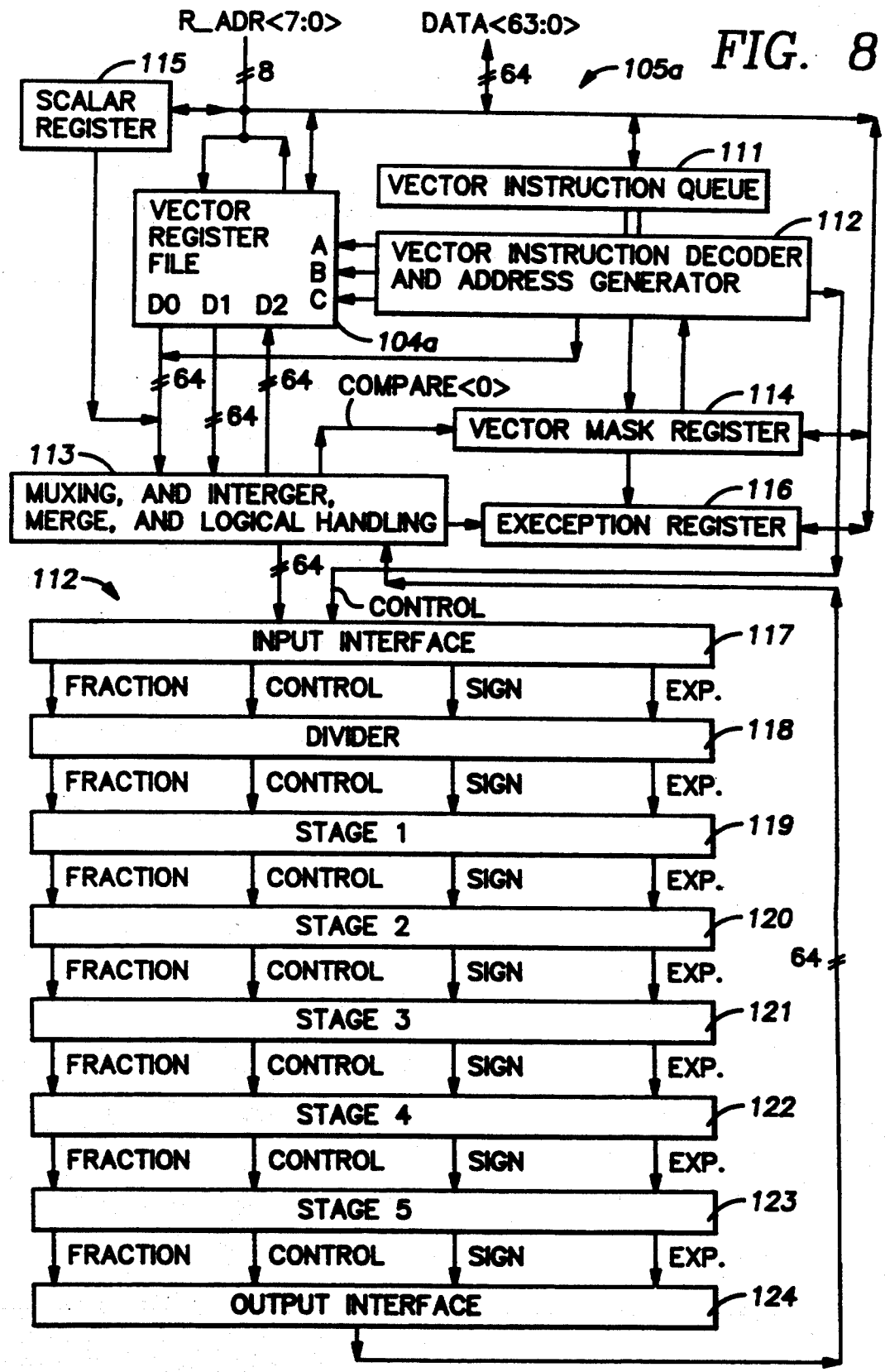
FIG. 8 is a detailed block diagram of a portion of the vector processor element of FIG. 7, showing the vector register file and the components in the vector function unit.

Turning now to FIG. 8, the functional blocks in the vector function unit 105a are shown in relation to the vector register file section 104a. The function unit 105a contains a two deep instruction queue 111, allowing the scalar CPU to transfer a next vector operate instruction to the VPE while the previous vector operate instruction is being executed by the function unit. Upon completion of an instruction, the next instruction is decoded by an instruction decoder and address generator 112 to address the register file section 104a and to control an integer arithmetic and logic unit 113. Vector elements can be masked by a mask in a vector mask register 114, and a mask can be generated as a result of a comparison between elements of vector operands. The content of a scalar register 115 may serve as an operand. Exceptions resulting from an operation are recorded in an exception register 116. For floating point operations, a control word is loaded along with operands from the vector register file 104a into a floating-point arithmetic pipeline 113. When vector operate instructions are executed by the VPEs, the four pipelines are operated in parallel, and thus the VPE can complete 4 operations per cycle.

The floating-point arithmetic pipeline 113 has an input interface 117, a divider 118, five intermediate stages 119-123, and an output interface 124. The first intermediate stage 119 receives its inputs from either the input interface 117 or the divider 118, and determines the difference between the exponents of the two operands, adds the fraction fields, and selects inputs for a multiply operation begun by the next stage 120. The second intermediate stage 120 receives its inputs from the previous stage 119, and does the first half of multiplying the fraction fields of the operands, and passes the intermediate results to the next stage 121. The third intermediate stage 121 receives its inputs from the previous stage 120, performs a right shift (alignment), does the second half of multiplying the fraction fields of the operands, and performs zero and leading one detection on the intermediate results. The fourth intermediate stage 122 receives its inputs from the previous stage 121, performs a left shift (normalization), and adds the fraction fields of the aligned operands. The fifth intermediate stage 123 receives its inputs from the previous stage 122, and drives its outputs to the output interface 124. The fifth intermediate stage 123 performs the terminal operations of the instruction such as rounding, exception detection (overflow, underflow), and determining condition codes.

d) The Write-Back Cache Controller and Vector Interface

Figure 9:
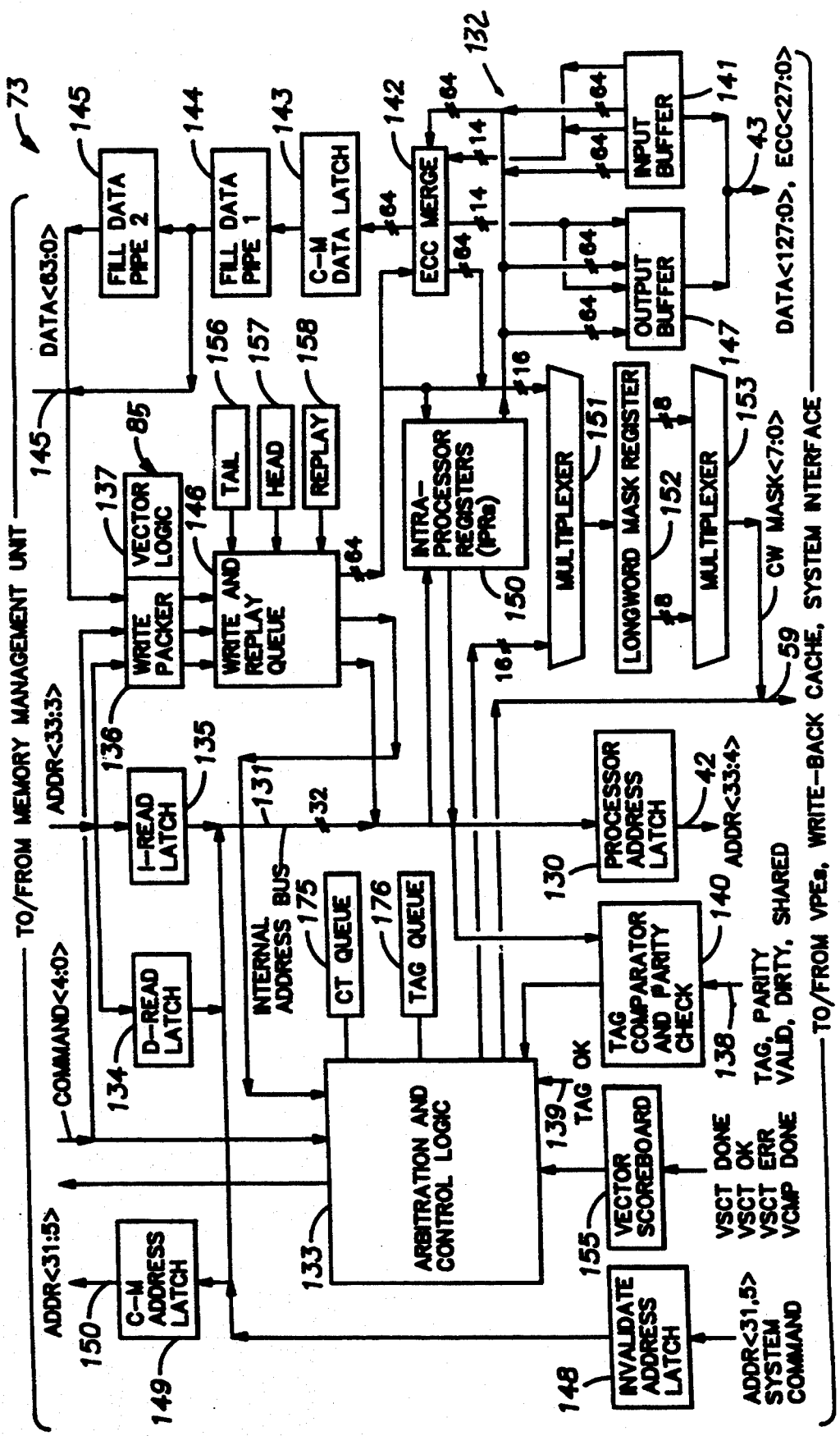
FIG. 9 is block diagram of the write-back cache controller in the scalar CPU of FIG. 5.

Turning now to FIG. 9, there is shown a block diagram of the write-back cache controller 73. The components at the top of FIG. 9 interface with the memory management unit (77 in FIG. 5), and the components at the bottom of FIG. 9 interface with the vector processing elements (51, 52 in FIG. 4), the write-back cache (44 in FIG. 4), and the system interface (46 in FIG. 4). Address or data transferred between the memory management unit and the VPEs, cache 44 or system interface, flow through an internal address bus 131 or internal data bus 132. Access to the internal address bus 131 and internal data bus 132 is arbitrated by arbitration and control logic 133. FIG. 9 shows the primary address, data, and command paths between the functional blocks of the cache controller 73, and it should be understood that the arbitration and control logic has numerous inputs (not shown in FIG. 9) receiving the status of the various queues and latches in FIG. 9 which may assert signals on the internal address bus 131 and the internal data bus 132, and the arbitration and control logic has numerous outputs (not shown) which enable the latching of data from the internal address bus 131 and the internal data bus 132 and control the selections of the multiplexers shown in FIG. 9.

The write-back cache controller 73 receives read, write, and vector processor requests from the memory management unit. Data-stream read requests are received in D-read latch 134, and instruction-stream read requests are received in an I-read latch 135. Write requests and vector processor requests are received in a write packer 136 that has associated vector logic 137. The arbitration and control logic grants these requests by accessing the write-back cache over the address bus 42 and data bus 43.

A valid, dirty, and shared bit are associated with each tag in the write-back cache (44 in FIG. 4), and are read from the cache with the tag and sent to the cache controller 77 via a bus 138 together with a "tag ok" signal on a line 139. In a multi-processor system, the valid and shared bits are written by the cache in response to fills from the main memory (45 in FIG. 4) and cache coherency commands from other processors (not shown). The dirty bit is written by the cache controller 73 on write hits to a non-shared block and indicates that the data in the cache (44 in FIG. 4) is no longer the same as in the main memory (45 in FIG. 4). For writes to shared blocks, the cache controller 73 cannot write directly into the cache, but must issue a "write block" command to the system bus (47 in FIG. 4) to broadcast the shared write to all other caches (not shown) in the system. For the cache controller 73 as shown in FIG. 9, the cache controller can have only one "miss" outstanding, and the cache cannot be used until the miss completes.

For reads, the tag and data stores of the write-back cache 44 are read together. The read address is transferred from the D-read latch 134 or the I-read latch 135 to a processor address latch 130 and asserted on the external address bus 42 to the cache (44 in FIG. 4). When the tag matches and the valid bit is set, as found by a tag comparator and parity check 140, the arbitration and control logic 133 returns the data to the memory management unit (77 in FIG. 5). The return data (and associated error correction code) passes through an input buffer 141 having two entries, each of which stores two quadwords of data, and fourteen bits of error correction code for each quadword. The input buffer 141 has dual quadword outputs, so that the two quadwords in each entry are asserted in succession onto internal data bus 132. The quadwords and error correction code pass to error correction circuits 142, and the quadwords then pass through a data latch 143 and a fill pipe including a first stage 144 and a second stage 145. The first and second stages 144, 145 each hold one quadword entry, and a flag indicating whether the fill data is in response to an instruction-stream read request. The fill data is pipelined for two cycles in the first and second stages 144, 145 so that the data bus 146 is driven coincidentally with a write-enable of the primary cache (71 in FIG. 5) in the memory management unit (77 in FIG. 5). The primary cache is written with data from the second stage 145, but if there is a free cycle on the bus 246, then data from the first stage 144 is asserted on the bus 146 and returned to the instruction unit (74 in FIG. 5) or the execution unit (75 in FIG. 5) one cycle early.

For a read in which the cache access misses, the arbitration and control logic 133 sends a "read block" request to the main memory (45 in FIG. 45). The arbitration and control logic then waits for the system to update the write-back request and deliver the fill data to the input buffer 141.

For writes, the arbitration and control logic 133 transfers write data from a write and replay queue 146 to an output buffer 147, and error correction code bits from the ECC merge logic 142 are also put into the output buffer. The output buffer has two entries, each of which holds two quadwords and 28 bits of error correction code. Each entry has separate load enables for each quadword, so that the two quadwords for each entry are successively transferred over the quadword-size internal data bus 132 and loaded into the entry. The arbitration and control logic 133 also initiates a probe cycle in which the tag and associated cache state bits are read from the write-back cache 44. If the probe cycle indicates a valid tag match for a valid block which is not shared, then the arbitration and control logic 133 writes the data from the output buffer 147 into the cache block. If the probe cycle indicates a miss or the block is shared, then the arbitration and control logic 133 sends a "write block" command to the system bus (47 in FIG. 4) and main memory (45 in FIG. 4). The "write block" command an associated eight bit longword mask indicating the longwords which are to be updated. The fill data is received in the input buffer 141, and the fill data is also received by the write-back cache (44 in FIG. 9) and written into the cache block.

The cache controller 73 does not directly control the writeback of data from cache (44 in FIG. 4), or the invalidation of cache blocks in response to cache coherency requests from other processors (not shown) in the system. Invalidate requests, however, are received in an invalidate address latch 147, transferred to a C-M address latch 149, and asserted on an address bus 150 to the primary cache (71 in FIG. 5) in the memory management unit.

Read and write commands from the memory management unit (77 in FIG. 5) may reference certain intra-processor registers 150 in the cache controller 73. These commands do not cause access to the write-back cache, because the intra-processor registers are addressed directly from the internal address bus 131, and read or written by transferring data over the internal data bus 132. The intra-processor registers 150 include a cache control register, various status registers for reporting errors, a register indicating completion of a read lock/write unlock sequence, a register for reading a serial input, a register for writing a serial output, and a number of vector control registers (160 in FIG. 10) used in connection with the vector logic 86. The intra-processor control cache control register is be set to enable or disable the write-back cache (44 in FIG. 4.), enable or disable ECC generation and checking by the ECC and merge unit 142, to force hits in the write-back cache, to set the expected speed of the write-back cache, to set a code indicating the memory size of the write-back cache, and to set a code indicating I/O space mapping.

Figure 10:
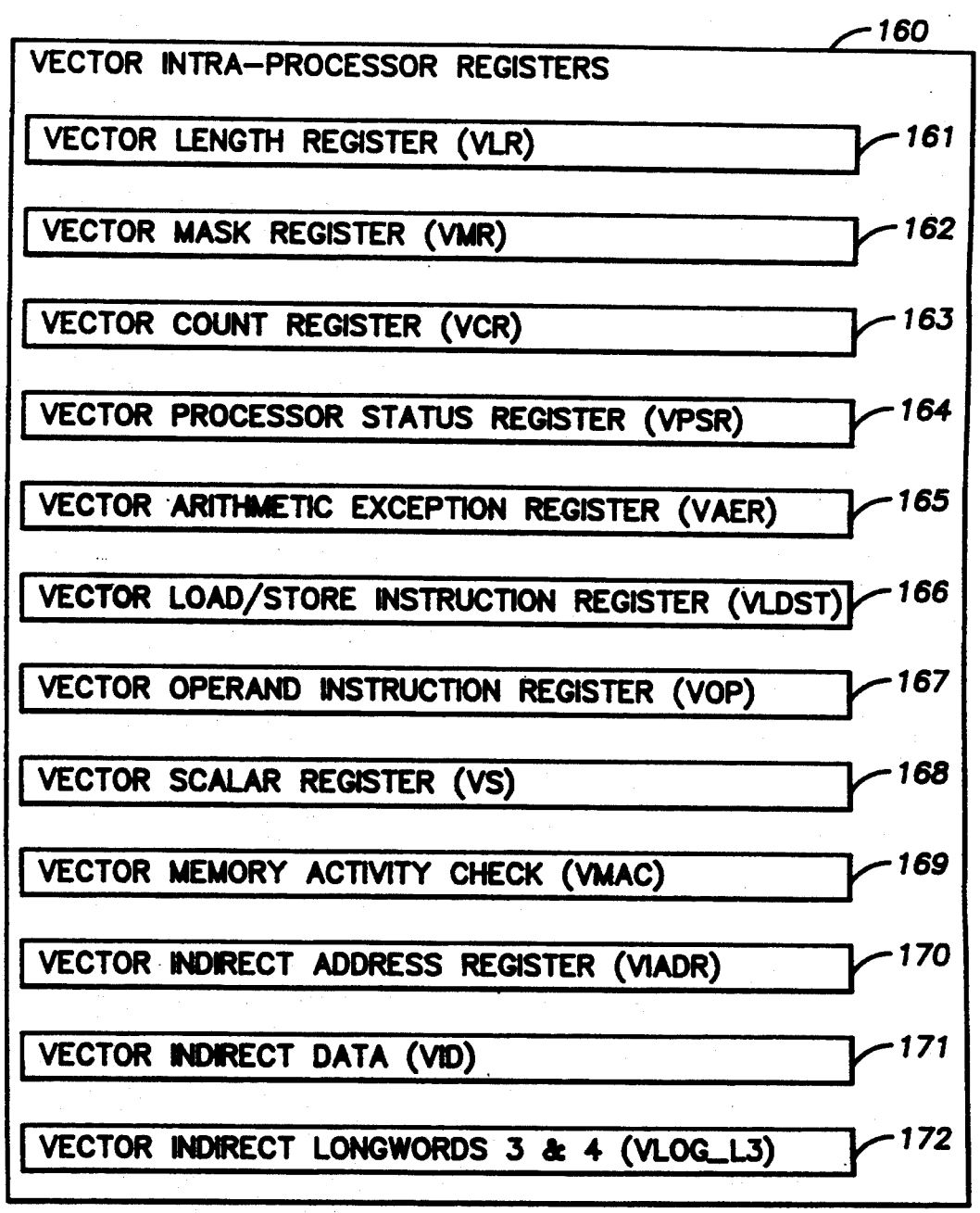
FIG. 10 is a block diagram of a set of intra-processor registers used by vector logic in the write-back cache controller of FIG. 9.

The vector control intra-processor registers 160 are shown in FIG. 10. The vector length register (VLR) 161 has seven bits. Their value limits the highest vector element to be processed by a vector instruction. VLR 160 is loaded by the micro-controller (76 in FIG. 5) when an MTVP instruction is executed. The value in VLR may range from 0 to 64. If the vector length is zero, no elements are processed. If a vector instruction is executed with vector length greater than 64, its results are unpredictable. Elements beyond the vector length in the destination vector register are not modified.

The vector mask register (VMR) 162 has sixty-four bits, and is addressable as two thirty-two bit registers denoted VMR low and VMR high. Bit $<0>$ of VMR low corresponds to vector element 0 and bit $<31>$ of VMR low corresponds to vector element 31. Bit $<0>$ of VMR high corresponds to vector element 32 and bit $<31>$ of VMR high corresponds to vector element 63. The VPEs maintain a separate copy of the mask register which is read and written by microcode using vector indirect IPRs, as described below.

The vector count register (VCR) 163 is a 7-bit register that receives the length of the offset vector generated by the IOTA instruction.

The vector processor status register (VPSR) 164 has thirty-two bits which indicate the status of the vector processor. Bit enables the VPEs (51, 52 in FIG. 4) when set to a logic 1 and disables the VPEs when set to a logic 0. If the vector processor encounters a disabling fault, this bit is reset, all outstanding instructions are finished, and then the micro-controller (76 in FIG. 5) handles the fault. Bit 1 is a "write only" reset bit, and when a logic 1 is written to this bit, the registers VPSR 164 and VAER 165 are cleared. Bit 7 indicates a disabling vector arithmetic exception. Information regarding the nature of the exception condition can be found in the VAER register 165. Writing a one to bit 7 clears this bit and clears the VAER 165. Writing a zero to bit 7 has no effect. Bit 24 indicates that the vector processor is disabled due to a hardware error. Bit 25 indicates that the vector processor is disabled due to receiving an illegal opcode. Bit 31 indicates whether the vector processor is busy, which is determined by checking whether a vector scoreboard (155 in FIG. 9) is empty.

The vector arithmetic exception register (VAER) 165 is used to record information regarding vector arithmetic exceptions. The destination register mask field of the VAER records which vector registers have received default results due to arithmetic exceptions. VAER $<16+n>$ corresponds to vector register Vn where n is between 0 and 15.

The vector load/store instruction (VLDST) register 166 is a write only register loaded by the micro-controller (76 in FIG. 5). It holds the vector opcode and control word, which is used by the vector logic (137 in FIG. 9) to control vector loads and stores, as further described below.

The vector operand instruction (VOP) register 167 is a write only register used by the micro-controller (76 in FIG. 5) to send the opcode of a vector instruction to the vector logic (137 in FIG. 9). The vector logic uses this information to pass the opcode to the VPEs (51, 52 in FIG. 4).

The Vector Scalar (VS) register 168 is a sixty-four bit register having addressable 32-bit VS low and VS high portions. The VS (VSL) register is used to transfer scalar operand data to the vector logic 137, for example, for transfer to the scalar registers (115 in FIG. 8) in the VPEs (51, 52 in FIG. 4).

The vector memory activity check (VMAC) register 169 facilitates memory synchronization between the vector processing and scalar processing, and can be used even if vector processing is disabled. The VMS (Trademark) operating system uses this register to perform memory synchronization in kernel mode. This register is only accessible from kernel mode using the MFPR instruction.

The vector indirect address register (VIADR) 170 is loaded by the micro-controller (76 in FIG. 5) with the address of a VPE register, the CT code and the read/-write bit W. The address is auto-incremented after operations with VIDLO, VIDHI, VLOGL3, and thus need not be reloaded to address the next element of a vector in the vector register file (104a, 104b in FIG. 7).

The vector indirect data register (VIARD) 170 is a sixty-four bit register addressable as separate thirty-two bit portions VID low and VID high. A read of VID low accesses the internal IPR, TBTAG, TBDATA, CACHE-TAG, CACHE-DATA, or VPEDATA/IPR as specified by VLADR<INDCSR, INDEX>. Bits <63:32> of quadword registers or memory elements are loaded into VID high. Bits <31:0> are returned to the execution unit (75 in FIG. 5). A write to VID low causes the register/memory element specified by VIADR<INDCSR INDEX> to be written. VID low provides bits <31:0>; bits <63:32> are sourced from the previously loaded VID high register. Therefore VID high buffers the high 32 bits of quadword arguments when accessing vector IPRs with VIADR 170.

The vector indirect longwords 3 and 4 register (VLOGL3) 172 is a quadword register that is used to buffer the high quadword of offset vector reads from the VPEs (51, 12 in FIG. 4) for the VGATH/VSCAT instructions. When read, the low longword is returned to the execution unit (75 in FIG. 5) and bits 63:32 are written to VIDHI.

The description of the vector intra-processor registers 160 suggests the manner in which a vector instruction is processed by the computer system of FIG. 4. When the micro-controller (76 in FIG. 5) first begins processing for a vector operate instruction, it writes the opcode and control word of the instruction to the vector operand instruction register (VOP) 167. The vector logic 137 responds by placing in the write and replay queue 146 an entry for writing the vector operate information to the instruction queues (11 in FIG. 8) of the VPEs.

When the micro-controller (76 in FIG. 5) first begins processing for a vector load or store instruction, it writes the opcode and control word of the instruction into the vector load/store instruction register (VLDST) 166. The vector logic 137, however, must wait for a vector command from the memory management unit (77), because the vector logic needs the corresponding physical memory address for the instruction. The vector commands from the memory management include vector load command (VLD), a vector load with a stride of 16 bytes (VLD16), a vector store (VSTR), and a vector store with a stride of 16 bytes (VSTR16). The microcode computes the virtual addresses for all of the elements of the VLD and VSTR instructions, based on a program-specified stride. The VLD16 and VSTR16 commands permit the vector logic to compute the physical addresses for the vector elements following the first element by successively incrementing the physical address by 16 bytes, so long as this does not cause crossing of a page boundary. When a page boundary is crossed, a new virtual-to-physical address translation is needed, so the vector logic sends the "new page" signal back to the micro-controller (76 in FIG. 5), as described above with respect to FIG. 6, so that the execution unit (75) sends the computed virtual address via the memory management unit (77), which translates the virtual address to a physical address, and therefore the vector logic 137 receives the required physical address.

For addressing the vector elements during processing of a vector load or store instruction, the micro-controller (76 in FIG. 5) in the execution unit (75 in FIG. 5) loads the vector longword mask including read/write bit W, the register file address (RFA) and control type (CT) into the vector indirect address register (VIADR). The number of vector elements has already been written into the VLR 161, and a vector mask has already been loaded into the VMR 162, to control the vector load and store instructions, as described above with reference to FIG. 6. The vector logic 137 auto-increments the register file address during a vector load/-store operation and thus the VIADR need not be reloaded by the micro-controller to address the next vector element. Upon receipt of a vector load/store command and its corresponding physical address, the vector logic 137 copies the contents of the VIADR and merges it into data bits data bits <63:48> associated with the command, and loads it into the write and replay queue 147. When the arbitration and control logic 133 services the write and replay queue 146, it asserts the entry of the write and replay queue 146 upon the internal address bus 131 and the internal data bus 132, and operates a multiplexer to select the 16 bits <63:48> from the internal data bus 64 and load them into a longword mask register 152. Then the arbitration and control logic 133 operates a multiplexer 153 to transmit the longword mask in the register 152 over the control bus 59 as two successive CW mask bytes to the VPEs (51, 52 in FIG. 4).

For reading and writing to vector, scalar, control, and status registers in the VPEs, the microcode loads the VIADR with the corresponding W, RAF and CT code, but then reads or writes to the vector indirect data register (VID) 171.

Returning now to FIG. 9, the write packer 136 is one entry deep and hold both address and data, and functions to compress sequential memory writes to the same quadword. The data compressed into the quadword is loaded in to the write and replay queue 146. In a somewhat similar fashion, the vector logic responds to vector commands by packing a quadword with vector information, according to the following format:

| | |
|---|---|
| DATA<63;48> | RFA/CT for VLD, VLD16, VSTR, VSTR16. |
| DATA<19:16> | Vc for VLD, VLD16, VSTR, VSTR16. |
| DATA<15> | FIRST-LDST for VLD, VLD16, VSTR, VSTR16. |
| DATA<31:0> | Scalar or CNTRLWD/VLR/Opcode for VXMIT. |

The vector logic accesses the vector intra-processor registers (160 in FIG. 10), and contains some additional registers that are not defined by the vector instruction architecture. These additional registers include: VDST, which indicates the destination register and is used to form RFA<9:6>; OPCODE<1>, a flip-flop that asserts a logic 0 to indicate a longword opcode and asserts a logic 1 to indicate a quadword opcode; RFAELECNT which is used to keep track of the next vector element for RFA<9:6>; VMRINDEX which is loaded from the VMR (162 in FIG. 10) and is used with MOE (21 in FIG. 1) and MTF (22 in FIG. 1) to determine a next mask and a next offset; and TEMPVLR which is loaded from the VLR and is decremented to count the number of required element addresses.

The operation of the vector logic 137 will now be described with respect to specific intra-processor registers and specific commands originated by the micro-controller (76 in FIG. 5) in the execution unit (75 in FIG. 5) and received by the cache controller 73 from the memory management unit (77 in FIG. 5).

The VLR 161 is loaded by an IPR write command to the VLR register. The vector logic 137 uses the vector length in the VLR to control the number of addresses needed for VLDx, VSTRx, VGATHx, and VSCATx. The vector length is transmitted to VPEs with the opcode and control word for vector operate instructions. For VCMP instructions, a signal VCMPUTST used by the micro-controller (76 in FIG. 5) is asserted if VLR>32.

The VMR 162 is loaded by an IPR write command to VMR low and an IPR write to IPR high. VMR low is updated for VCMP instructions by microcode before subsequent instructions are started. VMR high is updated for VCMP instructions by microcode if VLR>32 before subsequent instructions are started, as indicated by the signal VCMPUTST.

Longword scalar data or the low 32 bits of quadword scalar data for VSOP instructions are sent to the vector logic 137 by an IPR write command to the low 32-bit section of the VS register 168. The vector logic 137 loads the data section of the write queue with an entry containing the RFA/CT code (RPA=448,CT=L1) of the lower 32-bit portion of the VPE scalar register (115 in FIG. 8) in bits <63:48>, and the scalar data in bits <31:0>. The write queue CMD field is set to VXMIT. When servicing the write queue 146, the VXMIT command informs the arbitration and control logic 133 that the queue entry contains scalar or opcode information which is to be transmitted to the VPEs.

The high 32 bits of quadword scalar data for VSOP instructions are sent to the vector logic 137 by an IPR write command to the higher 32-bit portion of the VS register 168 and transferred to the VPE's in a similar fashion as the low 32 bits, except the RFA/CT code is set to (RPA=44C,CT=L1) to address the lower 32-bit portion of the VPE scalar register (115 in FIG. 8).

The control word and vector opcode for vector operate instructions are sent to the vector logic 137 by an IPR write command to the VOP register 176. Bits <31:16> of VOP register contain the control word and bits <7:0> contain the opcode. The vector logic loads the data section of the write queue with an entry containing the RFA/CT code (RFA=440,CT=L1) of the VPE instruction queue (111 in FIG.8) in bits <63:48>, the control word in bits <31:16>, the VLR in bits <14:8>, and the opcode in bits <7:0>.

The control word and vector opcode for VLDx, VSTRx, VGATHx, and VSCATx are sent to the vector logic 137 by an IPR write command to the VLDST register 166. The vector logic saves the VC field of the control word in its VDST register for later use in forming the RFA of the vector addresses which are to follow. The MOE and MTF bits are saved and used by the vector logic 137 to determine MASKNEXT which is to be used to mask off following commands from the memory management unit having command fields of VLD or VSTR. OPCODE<1> is saved and used to distinguish L for OPCODE<1>=0 and Q for OPCODE<1>=1. A FIRSTLDST flip-flop is set in order to keep the CT code for the first vector address received for VLD16 and VSTR16. The RFAELECNT is initialized to zero. The VMRINDEX is loaded from the VMR register 162. VMRINDEX is shifted right one bit position when VLD or VSTR memory commands are received from the memory management unit. VMRINDEX<0> is XORed with MTF to determine if the next vector address is masked. Masking is enabled if MOE=1. TEMPVLR is loaded from the VLR register 161. TEMPVLR decrements by 1 for each VLD, VSTR, or NOP command received from the memory management unit. TEMPVLR decrements by 1 or 2 for VLD16 or VSTR16 for Q dependent upon FIRST LDST, and address<3>. TEMPVLR decrements by 1,2,3 or 4 for VLD16 or VSTR16 for L dependent upon FIRSTLDST, and address<3:2>. TEMPVLR equal zero or negative asserts VEXIT and disables vector memory commands remaining in the pipeline.

The VLD command indicates a single longword or quadword from the address received with the command is to be loaded into the VPEs starting at RFA<10>=0, RFA<9:6>=VDST, RFA<5:0>=RFAELECNT. The CT codes are generated as:

CT=L1 for longword address <3:2>='00
CT=L2 for longword address <3:2>='01
CT=L3 for longword address <3:2>='10
CT=L4 for longword address <3:2>='11
CT=Q1 for quadword address <3>='0
CT=Q2 for quadword address <3>='1

The RFA/CT are loaded into the bits <63:48>of the data field of the write queue 146, the address is loaded into the address section of the write queue, and the CMD is loaded with VLD. RFAELECNT is incremented by count, and TEMPVLR is decremented by one. The VMRINDEX shifts and a signal indicating whether to select the next VLD/VSTR at the EM-Latch is driven to the MBOX. The VLD command is used for VLDx when MOE=1 or the stride does not equal 4 bytes for long or 8 bytes for quad, and for VGATHx.

The VSTR command indicates a single longword or quadword from the address received with the command is be written with data from the VPE starting at RFA<10>=0, RFA<9:6>=VDST, RFA<5:0>=RFAELECNT. The write queue 146 is loaded the same as for VLD except for the command field which indicates VSTR.RFAELECNT is incremented by one, and TEMPVLR is decremented by one. The VMRINDEX shifts and a signal indicating whether to select the next VLD/VSTR at the EM-Latch is driven to the memory management unit. The VSTR command is used for VSTRx when MOE=1 or the stride does not equal 4 bytes for long or 8 bytes for quad, and for VSCATx.

A NOP command from the memory management unit indicates a VLD or VSTR has been dropped (from the E-M latch 78 in FIG. 5) due to the MASKNEXT blocking signal. The RFAELECNT is incremented and TEMPVLR decrements to account for the rejected vector element. VMRINDEX shifts and the new state of MASK NEXT is driven through the memory management unit to the E-M latch.

The VLD16 command indicates consecutive longwords or quadwords from the address received with the command are to be loaded into the VPEs starting at RFA<10>=0, RFA<9:6>=VDST, RFA<5:0>=RFAELECNT. The CT codes are generated as:

| | |
|---|---|
| CT = L1, L2, L3, L4 | for FIRST_LDST, L, TEMP_VLR > 3, and address<3:2>='00'; count = 4 |
| CT = L1, L2, L3 | for FIRST_LDST, L, TEMP_VLR = 3, and address<3:2>='00'; count = 3 |
| CT = L1, L2 | for FIRST_LDST, L, TEMP_VLR = 2, and address<3:2>='00'; count = 2 |
| CT = L1 | for FIRST_LDST, L, TEMP_VLR = 1, and address<3:2>='00'; count = 1 |
| CT = L2, L3, L4 | for FIRST_LDST, L, TEMP_VLR > 2, and address<3:2>='01'; count = 3 |
| CT = L2, L3 | for FIRST_LDST, L, TEMP_VLR = 2, and address<3:2>='01' count = 2 |
| CT = L2 | for FIRST_LDST, L, TEMP_VLR = 1, and address<3:2>='01'; count = 1 |
| CT = L3, L4 | for FIRST_LDST, L, TEMP_VLR > 1, and address<3:2>='10'; count = 2 |
| CT = L3, | for FIRST_LDST, L, TEMP_VLR = 1, and address<3:2>='10'; count = 1 |
| CT = L4 | for FIRST_LDST, L, TEMP_VLR > 0, and address<3:2>='11'; count = 1 |
| CT = Q1, Q2 | for FIRST_LDST, Q, TEMP_VLR > 1, and address<3>='0'; count = 2 |
| CT = Q1 | for FIRST_LDST, Q, TEMP_VLR = 1, and address<3>='0'; count =1 |
| CT = Q2 | for FIRST_LDST, Q, TEMP_VLR > 0 and address<3:2>='1'; count = 1 |
| CT = L1, L2, L3, L4 | for not FIRST_LDST, L, TEMP_VLR > 3; count = 4 |
| CT = L1, L2, L3 | for not FIRST_LDST, L, TEMP_VLR = 3; count = 3 |
| CT = L1, L2 | for not FIRST_LDST, L, TEMP_VLR = 2; count = 2 |
| CT = L1 | for not FIRST_LDST, L, TEMP_VLR = 1; count = 1 |
| CT = Q1, Q2 | for not FIRST_LDST, Q, TEMP_VLR > 1; count = 2 |
| CT = Q1 | for not FIRST_LDST, Q, TEMP_VLR = 1; count = 1 |

The RFA/CT are loaded into the bits <63:48> of the data field of the Write Queue, the address is loaded into the address field of the Write queue, and the CMD field is loaded with VLD. The FIRSTLDST is loaded with the RFA/CT to inform the arbitration and control logic of a VSTR packing boundary condition. RFAELECNT is incremented by count, and TEMPVLR is decremented by count. FIRSTLDST is cleared. The VLD command is used for VLDX when MOE=0 and the stride equals 4 bytes for L or 8 bytes for Q. The arbitration and control logic does not need to distinguish VLD and VLD16 since the access is the same except for the CT code. This allows the full width of the data bus 43 to used in accessing memory for "stride one vectors". For CT codes specifying more than one longword or quadword, the target RFA corresponds to the lowest Lx or Qx. RFA+1 is used for the second, RFA+2 for the third, and RFA+3 for the fourth, when CT=L1, L2, L3, L4.

The VSTR16 command indicates consecutive longwords or quadwords from the address received with the command are to be written from the VPEs starting at RFA<10>=0, RFA<9:6>=VDST, RFA<5:0> RFAELECNT. The CT codes are generated the same as for VLD16. The write queue 146 is loaded the same as for VLD16 except for the command field which indicates VSTR16. RFAELECNT is incremented by count, and TEMPVLR is decremented by count. FIRSTLDST is cleared. The VLD command is used for VLDx when MOE =0 and the stride equals 4 bytes for L or 8 bytes for Q. The VLD2 command is used for stride=2 longword vector loads, allowing to longwords to be accessed per cache cycle. The CT codes are generated as:

| | |
|---|---|
| CT = L1, L3, | TEMP_VLR > 1 and address<3:2>='00'; count = 2 |
| CT = L2, L4 | TEMP_VLR >, and address<3:2>='01'; count = 2 |
| CT = L3 | for FIRST_LDST, L, TEMP_VLR > 1, and address<3:2>='10'; count = 1 |
| CT = L4 | for FIRST_LDST, L, TEMP_VLR > 1, and address<3:2>='11'; count = 1 |
| CT = L1 | TEMP_VLR = 1, and address<3:2>='00'; count = 1 |
| CT = L2 | TEMP_VLR = 1, and address<3:2>='01'; count = 1 |
| CT = L3 | TEMP_VLR = 1, and address<3:2>='10'; count = 1 |
| CT = L4 | TEMP_VLR = 1, and address<3:2>='11'; count = 1 |
| CT = L1, L3, | not FIRST_LDST, L, TEMP_VLR > 1, and address<3:2>='10'; count = 2 |
| CT = L2, L4 | not FIRST_LDST, L, TEMP_VLR > 1, and address<3:2>='11'; count = 2 |

For CT=L1, L3 the target RFA corresponds to L1, and RFA+1 corresponds to L3. For CT=L2,, L4 the target RFA corresponds to L2, and RFA+1 corresponds to L4. The VSTR2 command decodes to same CT codes as VLD2 for stride=2 longword vector stores. For Gather/Scatter and IOTA support, the micro-controller(76 in FIG. 5) uses the vector indirect IPRs to acquire the offset data specified in Vb of the control word. Four offsets are required over the 128 bit data bus 43 for each read of VINDATA, with bits 31:0 being returned as the IPR data. Bits 63:32 are loaded to the high-order 32-bits of VID 171, while bit 127:64 are loaded to VLOGL3 172. The second offset is returned when the IPR READ of the high section of VID 171 is executed. An IPR READ of VLOGL3 returns the third offset, and loads the high section of VID with the fourth and final offset obtain by the read of VINDATA. The Vector Indirect Address autoincrements on IPR READS of VINDATA, VLOGHIGH, and VLOGL3, and thus points to the next element of Vb for the next IPR READ of VINDATA. Once an offset is loaded into a working register it is added with the base specifier and driven into the pipeline of the execution unit (75 in FIG. 5) with MRQ=VLD for VGATHx, or MRQ=VSTR for VSCATx. VGATHx and VSCATx are the proceed exactly as VLDx and VSCATx from the perspective of the vector logic 137.

The micro-controller (76 in FIG. 5) executes the IOTA instruction using by reading the VLR 161, the low section of VMR 162, and the high section of VMR and using the auto-increment capability of the vector indirect address to perform the required packing.

As described above with reference to FIG. 9, a data stream read request received by the cache controller 73 from the memory management unit 77 is held in a data read latch 134. This D-read latch 134 is one entry deep and holds the address of the data stream read request and a five-bit code indicating the specific read command. The data stream read requests include DREAD, READ MODIFY, READ LOCK, and IPR READ commands.

An IREAD command received by the cache controller unit 73 from the memory management unit 77 is held in an instruction read latch 135. This I-read latch 135 is one entry deep and holds the address of the IREAD command, together with a five-bit code for the IREAD command.

Write requests received by the cache controller 73 from the memory management unit 77 are packed in the write packer 136 and then fed through the write queue 146. The write requests include IPR WRITES, WRITES, and WRITE UNLOCKS, as well as the vector load and store commands. As described above, the vector load and store commands are processed by the vector logic 86 into VXMIT commands which are loaded into the write queue, and treated as if they were memory-space write commands when checking for write-read conflicts, as will be described below.

The write queue 146, for example, has eight entries. The write packer 136, and each entry of the write queue 146, includes a valid bit, a data-stream write-read conflict bit DWR, an instruction-stream write-read conflict bit IWR, a five-bit command (CMD) indicating a specific command from the memory management unit (25 in FIG. 1) or a VXMIT command from the vector logic 137, a thirty-two bit physical address, eight byte enable bits enabling respective bytes of a quadword to be written, and the quadword of data to be written.

The write packer accumulates memory-space writes to the same quadword which arrive sequentially, so that only one write has to be done into the write-back cache 44. Only WRITE commands to memory space to the same quadword are packed together. When a memory space WRITE command to a different quadword is received, the write packer 136 is flushed by transferring its contents into the write queue 146. Other kinds of write requests pass immediately from the write packer 136 into the write queue 146 after the write packer 136 is flushed by transferring any existing data into the write queue. The write packer 136 is also flushed if an IREAD or DREAD arrives specifying the same hexaword as that of the entry in the write packer. The write packer 136 is also flushed whenever any condition for flushing the write queue, as described below, is met on the entry in the write packer. Moreover, the execution unit (23 in FIG. 1) can write to a control register to set a "disable pack" bit so that every write passes directly through the write packer without delay.

Normally, the arbitration and control logic 133 processes the read and write requests in the following order: first, any request in the D-read latch 134; second, any request in the I-read latch 135; and third, any request at the head of the write queue 146. Data reads are given priority over instruction reads in order to minimize the stalling of instruction decoding for need of data by an already-decoded instruction. Reads should be given priority over writes because a read is needed for the current processing of an instruction, whereas a write is the result of already executed instruction. However, a read which follows a write to the same hexaword (i.e., the same cache block) should not be executed before the write, or else the read might return "stale" data.

To permit the reads to bypass the writes whenever possible, the write packer 136 and the write queue 146 include conflict bits associated with their entries. In particular, one DWR conflict bit and one IWR conflict bit are associated with the write packer 136 and with each write queue entry, to indicate whether that entry has a so-called write-read conflict with any data read request in the D-read latch 134 or with any instruction read request in the I-read latch 135, respectively. In this regard, the general technique of checking read-write conflicts with write operations in write queue is disclosed in Fite et al., U.S. Pat. No. 5,125,083 issued Jun. 23, 1992, and incorporated herein by reference.

When a data read request is received in the D-read latch 134, its hexaword address is compared to the write addresses in the write packer 136 and in all entries in the write queue 146. Any entry with a matching hexaword address has its corresponding DWR conflict bit set. The DWR conflict bit is also set if the write packer or the write queue entry is an IPR WRITE command, a WRITE UNLOCK command, or an I/O space write. If any IWR conflict bit is set, the write queue 146 takes priority over the data read request allowing the writes up to the point of the conflicting write to execute first.

In a similar fashion, when an instruction read is received in the I-read latch 135, its hexaword address is compared to the write addresses in the write packer 136 and in all entries in the write queue 146. Any entry with a matching hexaword address has its corresponding IWR conflict bit set. The IWR conflict bit is also set if the write packer or the write queue entry is an IPR WRITE command, a WRITE UNLOCK command, or an I/O space write. If any IWR conflict bit is set, the write queue takes priority over instruction reads, allowing the writes up to the point of the conflicting write to execute first.

All of the DWR conflict bits are OR'd together to make one signal which is sent to the arbitration and control logic 133 to indicate that a write conflict exists on the current entry of the D-read latch 134. Similarly, all of the valid IWR conflict bits are OR'd together to make one signal which is sent to the C-box controller 133 to indicate that a write conflict exists on the current entry of the I-read latch 135. The arbitration and control logic 133 uses these signals to decide how to prioritize the execution of the commands currently in the D-read latch 134, I-read latch 135, and write queue 146.

As each write is executed, the conflict bits and valid bit of the entry are cleared. After the execution of the last write which conflicts with the data read in the D-read latch 134, there are no more DWR bits set, and the data read in the D-read latch 134 takes priority again, even if other writes arrived after the data read. In this way, a data read which conflicts with previous writes is not done until those writes are done, but once those writes are done, the data read proceeds.

The analogous statement is true for an instruction read which has a conflict. If the IWR conflict bit of a valid write queue entry is set and the instruction read is aborted before the conflicting write queue entry is processed, the write queue 146 continues to take precedence over the I-read latch 135 until the conflicting entry is retired.

If both a data read request in the D-read latch 134 and an instruction read in the I-read latch 135 have a conflict in the write queue 146, writes take priority until one of the reads no longer has a conflict. If the data read request no longer has a conflict, then the data read is done. Then the write queue 146 continues to have priority over the I-read latch 135 since the instruction read has a conflict, and when the conflicting writes are done, the instruction read may proceed. If another data read arrives in the meantime, it may be allowed to bypass both the writes and the instruction read if it has no conflicts.

In a similar fashion, the DWR and IWR conflict bits enforce read/write ordering to ensure that prior write requests in the write queue are serviced before a read request when the read request is a READ LOCK, an IPR READ, or an I/O space read, and when a prior write request is a WRITE UNLOCK, an IPR WRITE, or an I/O space write.

In particular, when a READ LOCK command arrives from the memory management unit 77, DWR conflict bits for all valid entries in the write packer 136 and the write queue 146 are set so that all writes preceding the READ LOCK are done before the READ LOCK is done. When any IPR READ command arrives from the memory management unit 77, all DWR conflict bits for valid entries in the write packer 136 and the write queue 146 are set, so that previous writes complete first. When any instruction stream I/O space read arrives, all IWR conflict bits for valid entries in the write packer 136 and the write queue 146 are set, so that previous writes complete first.

When a WRITE UNLOCK arrives, the write queue 146 is always empty since all of its valid entries were previously serviced before the corresponding READ LOCK was serviced.

When a new entry for the D-read latch 134 arrives, it is checked for hexaword address conflicts with the write queue 146. At this time, the DWR conflict bit is also set on any write queue entry which is an I/O space write, an IPR WRITE, or a WRITE UNLOCK.

Similarly, when any new entry for the I-read latch arrives, it is checked for hexaword address conflicts with the write queue 146. At this time, the IWR conflict bit is also set for any write queue entry which is an I/O space write, an IPR WRITE, or WRITE UNLOCK. Thus, all memory access commands from the Mbox, except memory space reads and writes, unconditionally force the flushing of the write (the completion of all entries marked with a conflict bit).

For queuing VXMIT commands, the write queue is provided with three pointers, instead of the conventional two pointers. As shown in FIG. 9, the three pointers include a tail pointer 156, a head pointer 157, and a replay pointer 158. From the point of view of the construction of the queue, and from the point of view of the write-read conflict detection described above: (1) the tail pointer 156 corresponds to the tail of a conventional queue, because entries are inserted in either case at the tail of the queue; (2) the head pointer corresponds to the head a conventional queue for the purpose of obtaining the next entry to be serviced by the arbitration and control logic, 133, but the head pointer does not correspond to the head of valid entries in the queue; and (2) the replay pointer corresponds to the head of valid entries in the queue. Therefore, for the head pointer is still used for reading an entry from the queue, but the replay pointer is used for determining whether the queue is full and for removing the entry from the queue.

Physically, a conventional queue can be implemented from a register file having an input bus and an output bus. The tail pointer of a conventional queue addresses the register to receive data from the input bus; in other words, the tail pointer is decoded to provide clock enable signals to the registers. The head pointer addresses the register to assert data on the output bus; in other words, the head pointer controls a multiplexer which selects the output of the addressed register.

The head and tail pointers of a conventional queue can be compared to provide a queue full and queue empty signals. The queue, for example, is initially empty when the head an tail pointers are equal, the tail pointer is incremented when and entry is inserted, the head pointer is incremented when an entry is removed, and the number of entries in the queue is given by subtracting the head pointer from the tail pointer, unless this difference "overflows" to zero when the queue becomes full. The queue becomes empty when this difference becomes zero as a result of removing an entry. The queue becomes full when this difference becomes zero as a result of inserting an entry.

Alternatively, a conventional queue may use valid bits which are set when an entry is loaded and cleared when an entry is removed and invalidated; the queue is full when all of the entries are valid, as detected by a logical AND of the valid bits, and empty when none of the bits are set, as detected by a logical NOR of the valid bits.

To make a repay queue, such as the "write and replay queue" 146, from a conventional queue, the register file of the queue is provided with a second output port, for example by adding a second output multiplexer, and a third register or counter is provided to control this second output multiplexer. This third register or counter corresponds to the head pointer 157 in FIG. 9. The tail pointer of the conventional queue corresponds to the tail pointer 156, and the head pointer of the conventional queue corresponds to the replay pointer 158 in FIG. 9.

When processing VXMIT commands from the write queue 146 for vector store operations, it is desirable to arbitrate an VXMIT command from head of the write queue, and if that command is granted, then the head pointer is advanced to arbitrate a next command, but the replay pointer is not advanced until the command is committed, so that the command remains in the queue for "replay" if the command is aborted. When the command is aborted, the head pointer is set to the replay pointer and arbitration is repeated. In addition to this replay function, the replay queue 146 also facilitates "command merging" in which several queued commands can be "merged" for execution by sharing part of the execution sequence among commands. For example, to perform vector store operations into the cache at a continuous rate of about one store per cycle, the arbitration and control logic 133 merges vector stores to the same cache block so that only one cache tag probe would be needed for all the stores to the same block.

Preferably the write and replay queue 146 accepts the following command signals from the command sequencer, so that these signals, when issued in appropriate sequence, perform pipelined execution with replay and merge functionality:

| Signal Name | Replay Queue Action |
| --- | --- |
| 1. Read_cmd_from_head | Read COMMAND from the entry pointed to by the head pointer. |
| 2. Read_adr_from_head | Read ADDRESS from the entry |

| Signal Name | Replay Queue Action |
|---|---|
| | pointed to by the head pointer. |
| 3. Read_cmd_from_replay | Read COMMAND from the entry pointed to by the replay pointer. |
| 4. Read_adr_from_replay | Read ADDRESS from the entry pointed to by the replay pointer. |
| 5. Advance_head | Increment head pointer. |
| 6. Advance replay | Increment replay pointer (entry may now be replaced with a new entry) |
| 7. Retreat | Back-off; readjust head pointer to location pointed to by the replay pointer |

To illustrate these commands, consider execution of a stride-1 vector load instruction. As described above, the execution unit (75 in FIG. 5) issues stride-1 vector store commands into the pipeline through the memory management unit (77 in FIG. 5). The commands received by the vector logic 137 and loaded into the write and replay queue 146. Because the writeback cache 44 has a cache of block size 64 bytes (4 quadwords), and the data bus 43 has a width of 128 bits, up to 4 vector store operations per cache block can possibly be merged. By merging the four vector store operations, only one probe cycle (tag lookup) is needed for the four vector stores.

The result of the probe cycle is saved in a CT queue 175 and a tag queue 176, which preferably are shift registers. The CT codes in the CT queue 175 identify which write enables are to be asserted for the writes following a probe. If no write enables are to be asserted and there are further stores, then the cycle is used for a probe for the next store. The tag queue 176 contains the hit/miss for the probe and is used to determine if the VPE can be written directly to the write-back cache 44 in the case of a hit or if a cache fill operation (a WRITE BLOCK) must be initiated in the case of a miss.

The write and replay queue 146 command sequence for merging four vector stores will now be described. Assume that at the beginning of the probe cycle, the head pointer 157 is pointing at a new vector store for which a probe is yet to be made. The replay pointer 158 is pointing at the first of the four vector stores for which a probe was previously performed. In the probe cycle, the following replay queue commands are issued:

```
-Read_cdm-from-head
-Read_adr_from_head
-Advance_head
```

This command sequence allows the memory address for the probe to be driven out to the cache 44 and the arbitration and control logic 133 will issue appropriate control signals after recognizing the command. The head pointer 157 will point to the next entry, which is again a vector store. At the end of probe cycle, conditions for complete execution of a vector store will be examined, namely the availability of the bus 43 and result of the probe made for this store five cycles ago. If the store can complete, then the arbitration and control logic 133 issues the following commands:

```
-Read_adr_from_replay
-Advance_replay
-Read_cmd_from_head
```

```
-Advance_head
```

This command sequence allows the vector store memory address to be driven out to the cache 44. Since the store operation will complete, the replay pointer is advanced. The second vector store command is read from the head of the queue and the arbitration and control logic 133 recognizes that it does not need a probe cycle, because it is to the same cache block as the previous vector store command.

Next, three vector stores are performed in the same way. Both the replay pointer 158 and the head pointer 157 advance. However, if for any reason a vector store scheduled for a next cycle cannot be executed, the arbitration and control logic 133 instead issues the following command:

```
-Retreat
```

The replay pointer 158 was pointing at the failing vector store and the head pointer 157 had advanced. The above retreat command realigns the head pointer with the replay pointer. The arbitration and control logic then enters a stall state. When the stall condition is removed, the Load/Store unit initiates the vector store operation at the point from where it was interrupted.

Thus the replay feature of the write queue 146 allows vector stores to be performed at a sustained rate of 4 stores in 5 cycles. This pipelined execution requires that the commands be speculatively requested (from the head pointer) and later on re-requested (by retreat) if they cannot be performed. In addition, the execution sequence is merged: only 1 probe is performed per 4 stores.

Because the vector load/store operations are initiated by the cache controller 73 and the vector operate operations are performed by the VPEs independently of the vector load/store operations, it is possible for a vector load/store following a vector operate in the computer program to be performed before or during the vector operate so long as there is no conflict. In this manner the performance of the system is enhanced because the vector load/store is effectively performed in parallel with the vector operate. To detect conflicts between the vector load/store and the pending vector operates, the cache controller 73 in FIG. 9 has a vector scoreboard 155 that records information about the pending vector operates. Because two vector operates can be pending in the VPEs, the vector scoreboard can hold information for up to two vector operates.

Preferably the vector scoreboard 155 is a two-register first-in first-out queue containing information about the presently executing vector instruction and one pending vector instruction. The vector scoreboard 155 shadows the vector instruction queue (111 in FIG. 8). Each entry of the vector scoreboard 155 contains a Va field, a "Va is scalar" bit (opcode bit 0), a Vb field, a Vc (destination) field, a compare bit (indicating whether the opcode<7:4>='1100), a DIV bit (indicating whether the opcode<7:3>='10101, A8-AF), a STOK bit, and a BUSY bit. If the "Va is scalar" bit is set for an entry, then Va conflicts are not indicated. Vector commands in the Write-Queue and IPRRDs to the VID register 171 or VMAC synchronizing register 169 are delayed if VPE conflicts are detected with the information in the vector scoreboard 155.

If there is zero or one instruction presently at the VPEs, then scalar data for the next instruction and the next Cntrlwd/VLR/Opcode can be sent to the VPEs, so that "stok" is cleared, and "busy" is set. A low to high transition of BUSY from the VPEs indicates the first element has been written to the register file of the VPEs and therefore the stok bit for the presently executing instruction is set if the instruction is not a DIV (vector divide). The high to low transition of the BUSY signal from the VPEs indicates completion of an instruction by the VPEs and clears the "busy" bit for the presently executing instruction.

The specific rules for the vector scoreboard 155 are:
(1) if command=VXMIT/scalar, issue unless busy is set for both scoreboard entries;
(2) if command=VXMIT/opcode, issue unless busy is set for both scoreboard entries, update the vector scoreboard;
(3) if command=VSTR16, VSTR2 or VSTR/MOE=0, issue if RFA<9:6> does not equal a pending Vc or executing Vc with stok=0;
(4) if command=VSTR/MOE=1, issue if RFA<9:6> does not equal a pending Vc or executing Vc;
(5) if command=VLD16, VLD2 or VLD/MOE=0, issue if RFA<9:6> does not equal a pending Va, Vb, Vc or executing Va, Vb, Vc with stok=0;
(6) if command=VLD/MOE=1, issue if RFA<9:6> does not equal a pending Va, Vb, Vc or executing Va, Vb, Vc;
(7) if IPRRD SYNC, issue if scoreboard empty (no busy bit set); and
(8) if IPRRD VIND, issue if scoreboard empty or stok =1 for single busy entry.

For vector compare instructions, the micro-controller (76 in FIG. 5) of the execution unit (75 in FIG. 5) reads the VPE copy of the mask and update the VMR (162 in FIG. 10) if the VLR>32, before proceeding to the next instruction. Therefore, conflicts with respect to mask validity never occur.

When the VPEs assert VPEEXC, VAER<31:16> (165 in FIG. 10), the vector destination register mask is set from the Vc field of the presently executing instruction if the compare bit is not set. Vc='0000 sets bit 16, Vc='0001 sets bit 17, etc.

The arbitration and control logic 133 selects the highest priority command from the write and replay queue 146, D-read latch 134, or the I-read latch, and executes a respective sequence for the selected command. The command sequences include DREAD, READ LOCK, IPR READ, IREAD, WRITE, WRITE BYTE/WORD, WRITE UNLOCK, IPRWR, VECTOR XMIT, VECTOR LOAD, VECTOR STORE WITH STRIDE=1 or 2, and VECTOR STORE WITH STRIDE=n.

Preferably the arbitration and control logic 133 includes an ARBITRATOR state machine, and two satellite machines, a DISPATCH controller and a FILL controller, that operate in response to the ARBITRATOR. Combinational logic for the state machines is provided by programmable logic arrays. The DISPATCH controller selects the next command, controls the write and replay queue pointers 156, 157, 158, and drives the required address to the address bus 42. The FILL controller moves system commands (invalidates) and data to the memory management unit, and checks ECC or parity when enabled by the ARBITRATOR.

The ARBITRATOR enters the 'DREAD' state if a DREAD is in the DREADLATCH and no Dread/Write conflict bits are set in the write and replay queue 146 and the cache 44 is enabled by the cache control register in the IPRs 150.

The ARBITRATOR enters the 'READ LOCK' state if a READ LOCK is in the D-read latch 134 and no D-read/write conflict bits are set in the write queue 146 (i.e., the write queue has emptied), and TAG OK is asserted.

The ARBITRATOR enters the 'IPRRD' state if an IPRRD is in the D-read latch 134 and no D-read/write conflict bits are set in the write queue 146 (i.e., the write queue has emptied). 'IPRRD2 checks the register address to determine if an IPR 150 in the cache controller 73 is to be read, or if a VPE register using the VIADR (170 in FIG. 10) is to be read. If the source of the IPRRD is an IPR 150 in the cache controller 73, the data is driven to the C-M data latch 143 and the DREADLATCH clears. The next state is selected using the arbitration priorities. If the source is VLOGL3 then VINDHI is loaded with the high longword. If the source is an indirect register VINADDR is incremented. If the VID IPR (171 in FIG. 10) is to be read, the RFA/CT address present in the VIADR IPR (170) is transmitted to the VPEs with the r/w bit=read, when the vector scoreboard 155 has no vector instructions active or only one active vector instruction which has received ST-OK. If data is taken by the system from the data bus 43 during the next five cycles, however, the VPE read sequence is restarted because a system request is given priority.

The ARBITRATOR enters the 'IREAD' state if the D-read latch 134 is empty or a D-read/write conflict bit is set in the write queue 146 and an IREAD is valid in the IREADLATCH and no I-read/Write conflict bit is set in the write queue, and the cache is enabled by the cache control register of the IPR registers 150.

The ARBITRATOR enters the "WRITE" state if: the D-read latch 134 is not valid or a D-read/write conflict bit is set in the write queue 146; the I-read latch 135 is not valid or an I-read/write conflict bit is set in the write queue 146; the write queue CMD=WRITE; BM<7:4>='1111 or '0000; and the byte mask bits BM<3:0>='1111 or '0000.

The ARBITRATOR enters the "WRITE BYTE/WORD" state if: the D-read latch is not valid or a D-read/write conflict bit is set in the write queue 146; the I-readlatch is not valid or an I-read/write conflict bit is set; the Write Queue CMD=Write; and either the byte mask BM<7:4> is not ('1111 or '0000), or BM<3:0> is not ('1111 or '0000).

The ARBITRATOR enters the "WRITEUNLOCK" state if: the D-read latch is not valid or a D-read/write conflict bit is set in the write queue 146; the I-read latch 135 is not valid or a I-read/write conflict bit is set in the write queue 146; and the write queue CMD=WRITE UNLOCK.

The ARBITRATOR gives priority to a VECTORXMITSCALAR or VECTORXMITOPCODE request if: the D-read latch 134 is not valid or there is a d-read/write conflict; the I-read latch 135 is not valid or there is an i-read/write conflict; the command at the head of the write queue 146 is VECTORXMIT; the vector scoreboard 155 is not full, and the command does not need to wait for any memory synchronization. Then the arbitrator enters an ARB state 'VXMIT. The write queue data bits <63:48> contain the RFA/CT code of the VPE register to be written, RFA=448 for the low order 32-bits of the vector scalar register (115 in FIG. 8), RFA =44C for the high order 32-bits of the vector scalar register (115 in FIG. 8), and RFA=440 for the vector instruction queue (111 in FIG. 8), and the write queue 146 data bits <31:0> contain the scalar data or CntrlWd/VLR/Opcode to be transmitted to the VPEs. The output buffer 147 is loaded with the data from the write queue 146 and driven to data<31:0> of the data bus 43. The RFA/CT is driven on data<63:48> of the data bus 43 for visibility. The RFA/CT is driven to the VPEs over the CW mask bus 59, and RFAV (RFA valid) is asserted on this bus 59 to indicate to the VPEs that the bus 59 is being used for a vector RFA transfer. If the RFA=440 the Vector Scoreboard is updated from the write queue 146 data<31:16>=(control word), and WriteQueue<7:0>=(vector opcode). The write queue entry is removed, and the next state is selected using the arbitration priorities.

During a vector load, the cache cycles do not write to the tag ram. Therefore when the signal BMAPHIT indicates the previous tag lookup was valid, and the cache data bus is usable for at least the next 3 cycles of the data bus 43, the signal BMAPHIT can be used instead of TAG OK to determine whether vector loads need to be retried. BMAPHIT asserts only when the cache is actually being taken by the system, and not for every system bus command as is the case with TAG OK.

The ARBITRATOR gives a VECTORLOAD the highest priority when: the D-read latch 134 is not valid or has a d-read/write conflict; the IREADLATCH is not valid or has a i-read conflict; the write queue 146 command=VECTORLOAD; the vector scoreboard does not have conflict with the load destination RFA<9:6>; and BMMAP-HIT is not asserted. Then the ARBITRATOR state 'VLD' is entered. The address contained in the write queue 146 was driven on the internal address bus 131 last cycle, and is presently being driven on the address bus 42. The RFA/CT is driven to the VPEs over the CW-mask bus 59. The cache data is latched by the VPEs from the cache data RAMS. At the next cycle of the bus 43:tagAdr-h<31:17>, tagAdrPh, tagCtIVh, tagCtIDh, tagCtISh, and tagCt1Ph are latched; BMAPHIT is latched into a synchronizer flip-flop; and the next ARB state is determined as (1) if syncbmaphit then "RETREAT" (set WRITEQUEUE to backup pointer, next IDLE'), (2) if not SYNC and previous read hit then DISPATCH, 'VLD' next if highest priority, (3) If not SYNC and previous readmiss then (a) if tagCEOE is asserted, must reprobe missed address, "RETREAT" next ARB state is 'VLDMISS' (b) if , not tagCEOE, "RETREAT", next ARB state is VLDSYS. ECC errors on data received by the VPEs are reported through the ERR interrupt.

For a VLD miss, the write queue head pointer 157 is set to the replay pointer 158 to initiate a replay operation, beginning with a re-probe of the cache by driving the address of the VLD miss to the address lines 42.

For vector stores the requested VPE data will be driven on the bus 43 five bus cycles after the RFA/CT transfer over the CW mask and control bus 49 which requests data to be output from the VPE. For a RFA/CT in a first bus cycle, the corresponding data drives the data bus 43 in the sixth cycle, unless bmaphit is detected prior to that cycle.

There are three vector store command fields in the write queue 146, VSTRSTRIDE, VSTR16, and VSTR2. VSTRSTRIDEs are for vector stores which are not stride=1 or stride=2 for longword with MOE=0 (not masked). VSTR16 and VSTR2 indicate the next octaword can be written to without another cache probe if address<5:4> is not '00 (a new 64 byte block) and FIRSTLDST=0 (not a new instruction). A probe is required for each element for VSTR and for each cache block for VSTR16 and VSTR2. Thus, a longword or quadword can be written every two cache cycles for VSTRSTRIDE, while four octawords can be written in five cycles for VSTR-16 and 8 longwords in five cycles for VSTR2. The tag RAM dirty bit is written on the first write cycle of a block if the present state is non-dirty.

When the data from the VPE is written to cache, the CT queue 175 determines the write enables as:

| | |
|---|---|
| CT = '0000 is NOP | data WE_h<3:0> = '0000 |
| CT = '0001 is L1 | data WE_h<3:0> = '0001 |
| CT = '0010 is L2 | data WE_h<3:0> = '0010 |
| CT = '0011 is L1, L2 | data WE_h<3:0> = '0011 |
| CT = '0100 is L3 | data WE_h<3:0> = '0100 |
| CT = '0101 is L1, L3 | data WE_h<3:0> = '0101 *stride 2* |
| CT = '0110 is L2, L3 | data WE_h<3:0> = '0110 |
| CT = '0111 is L1, L2, L3 | data WE_h<3:0> = '0111 |
| CT = '1000 is L4 | data WE_h<3:0> = '1000 |
| CT = '1001 is Q1 | data WE_h<3:0> = '0011 |
| CT = '1010 is Q2 | data WE_h<3:0> = '1100 |
| CT = '1011 is Q1, Q2 | data WE_h<3:0> = '1111 |
| CT = '1100 is L3, L4 | data WE_h<3:0> = '1100 |
| CT = '1101 is L2, , L4 | data WE_h<3:0> = '1010 *stride 2* |
| CT = '1110 is L2, L3, L4 | data WE_h<3:0> = '1110 |
| CT = '1111 is L1, L2, L3, L4 | data WE_h<3:0> = '1111 |

In summary, the present invention more tightly couples a vector processor to a scalar CPU than previous implementations of uvector processing systems. The scalar pipeline through a memory management unit and a cache controller of the scalar CPU are used to support vector load/store addressing and vector instruction transfer. Minimal logic is added to the scalar CPU to support the vector instructions, with microcode being added to the scalar CPU execution unit for implementing the control sequences for vectors, and with logic for vector register address generation, vector register conflict detection, and vector processor control being added to the scalar CPU cache controller. The vector processing elements attach directly to the cache data bus. The width of the cache data bus is exploited to obtain a high bandwidth connection between the vector processing elements and the memory system. No additions to the system interface logic are required. The present invention provides an extremely low cost and high performing system for a wide range of applications which require a significant amount of communication between scalar and vector instructions.

While the invention has been described with reference to a specific embodiment, the description is not meant to be construed in a limiting sense. Various modifications of the disclosed embodiment, as well as other embodiments of the invention, will be apparent to persons skilled in the art upon reference to this description. It is therefore contemplated that the appended claims will cover any such modifications or embodiments which fall within the true scope of the invention.

What is claimed is:

1. A digital computer system comprising, in combination:
   a scalar central processing unit;
   a vector processor; and a cache memory coupled to said scalar central processing unit for scalar reads and writes between said scalar central processing unit and said cache memory, and coupled to said vector processor for vector loads and stores between said vector processor and said cache memory;

wherein said scalar processing unit includes:
- (a) an execution unit for executing scalar instructions and for issuing vector instructions to said vector processor,
- (b) a memory management unit for translating virtual addresses of both said scalar instructions and said vector instructions to physical addresses, and
- (c) a cache controller unit for coordinating data transfer between said scalar central processing unit and said cache memory; and wherein said execution unit includes means for computing virtual memory addresses of vector elements specified by vector load and vector store instructions and sending the virtual memory addresses to said memory management unit for translation to physical addresses, wherein said cache controller unit includes means for coordinating both:
- (a) vector loads and stores between said vector processor and said cache memory, and
- (b) scalar reads and writes between said scalar central processing unit and said cache memory; and wherein said cache controller unit, said cache memory, and said vector processor are directly connected together by a common address bus and a common data bus;

wherein said cache controller unit includes a write queue for queuing both:
- (a) scalar physical write addresses and scalar write data, and
- (b) physical addresses of said vector elements of said vector store instructions; and means for servicing said write queue by addressing said cache memory with said scalar physical write addresses in said write queue for scalar operations and by addressing said cache memory for vector operations with said physical addresses of said vector elements in said write queue.

2. The digital computer system as claimed in claim 1, wherein said write queue includes means for inserting physical addresses of said vector elements of vector load instructions as well as said vector store instructions in said write queue together with vector load and store commands.

3. The digital computer system as claimed in claim 1, wherein said cache controller unit includes arbitration means for granting priority to allow scalar reads to precede scalar writes and vector stores if, upon checking for conflicts with scalar writes and vector stores in said write queue, there is no conflict.

4. The digital computer system as claimed in claim 1, wherein said cache controller unit includes a vector scoreboard for storing information about vector operate instructions issued to said vector processor by said execution unit, and arbitration means for granting priority to allow vector loads and stores to precede vector operates if, upon checking for conflicts with said information about vector operate instructions, there is no conflict.

5. The digital computer system as claimed in claim 1, wherein said cache controller unit includes intra-processor registers written to by said execution unit, and vector logic means responsive to said intra-processor registers for counting vector elements having physical addresses translated by said memory management unit, and sending a termination signal to said execution unit when said count reaches a specified vector length.

6. The digital computer system as claimed in claim 1, wherein said cache controller unit includes intra-processor registers written to by said execution unit, and vector logic means responsive to said intra-processor registers and receipt of said physical addresses of vector elements from said memory management unit for generating a blocking signal for a next vector element which is masked by a specified vector mask, and said execution unit includes means for blocking a virtual address of said next vector element from being translated by said memory management unit.

7. The digital computer system as claimed in claim 1, wherein said cache controller unit includes vector logic means for receiving a physical address of a first vector element of a vector, computing physical addresses of successive vector elements, and sending a next page signal to said execution unit when the physical address of a next vector element crosses a page boundary.

* * * * *